(12) United States Patent
Choe

(10) Patent No.: US 10,537,921 B2
(45) Date of Patent: Jan. 21, 2020

(54) WASTEWATER RECLAMATION APPARATUS AND WASTEWATER-RECYCLING WASHING EQUIPMENT INCLUDING SAME

(71) Applicant: DREAM HEAT TREATING CO., LTD., Gyeonggi-do (KR)

(72) Inventor: Byung-Gil Choe, Gyeonggi-do (KR)

(73) Assignee: DREAM HEAT TREATING CO., LTD., Gyeonggi-Do (KR)

( * ) Notice: Subject to any disclaimer, the term of this patent is extended or adjusted under 35 U.S.C. 154(b) by 604 days.

(21) Appl. No.: 15/027,376

(22) PCT Filed: Oct. 2, 2014

(86) PCT No.: PCT/KR2014/009336
§ 371 (c)(1),
(2) Date: Apr. 5, 2016

(87) PCT Pub. No.: WO2015/053511
PCT Pub. Date: Apr. 16, 2015

(65) Prior Publication Data
US 2016/0236243 A1    Aug. 18, 2016

(30) Foreign Application Priority Data

Oct. 10, 2013  (KR) .................. 10-2013-0120374
Sep. 25, 2014  (KR) .................. 10-2014-0128084

(51) Int. Cl.
*B08B 3/14* (2006.01)
*C02F 1/04* (2006.01)

(52) U.S. Cl.
CPC ............ *B08B 3/14* (2013.01); *C02F 1/048* (2013.01)

(58) Field of Classification Search
None
See application file for complete search history.

(56) References Cited

U.S. PATENT DOCUMENTS 3,336,016 A * 8/1967 Schreiber ............ B01F 3/04106
                                                210/220
6,129,099 A * 10/2000 Foster ...................... B08B 1/02
                                                134/111

(Continued)

FOREIGN PATENT DOCUMENTS

EP         1717209 A1 * 11/2006  ............. C02F 11/12
JP      2001046801       2/2001

(Continued)

*Primary Examiner* — Rita P Adhlakha
(74) *Attorney, Agent, or Firm* — IPLA P.A.; James E. Bame

(57) ABSTRACT

A wastewater reclamation apparatus and wastewater-recycling washing equipment including the same includes: a reclamation tank configured such that a wastewater intake tube is connected to the lower portion thereof so that wastewater discharged from an external apparatus enters thereinto and is stored therein, a vapor supply tube is connected to the upper portion thereof so that the stored wastewater is heated and then supplied in a vapor form back into used water inside the external apparatus, and a wastewater inflow pump is provided on the wastewater intake tube; a heater provided in the reclamation tank, and configured to heat the wastewater; and a waste sludge discharge assembly provided below the reclamation tank so that deposited wastewater sludge is discharged to the outside.

5 Claims, 12 Drawing Sheets

(56) References Cited

U.S. PATENT DOCUMENTS

| | | | |
|---|---|---|---|
| 8,182,676 B2 * | 5/2012 | Terry, III | B01D 21/0012 |
| | | | 210/170.08 |
| 8,187,429 B2 * | 5/2012 | Chung | C02F 1/02 |
| | | | 159/15 |
| 8,603,336 B2 * | 12/2013 | Frommann | F28D 1/0213 |
| | | | 210/256 |

FOREIGN PATENT DOCUMENTS

| | | |
|---|---|---|
| KR | 1020010037224 | 5/2001 |
| KR | 2002666200000 | 2/2002 |
| KR | 1020110123879 | 11/2011 |

* cited by examiner

[Fig. 1]
Prior Art
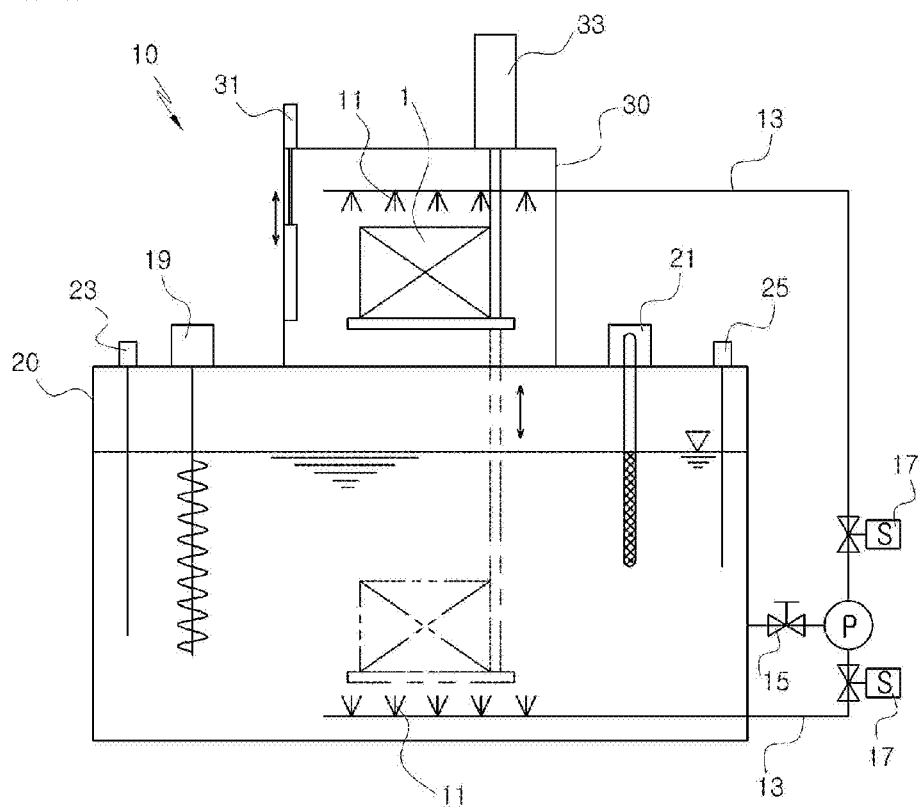
[Fig. 2]
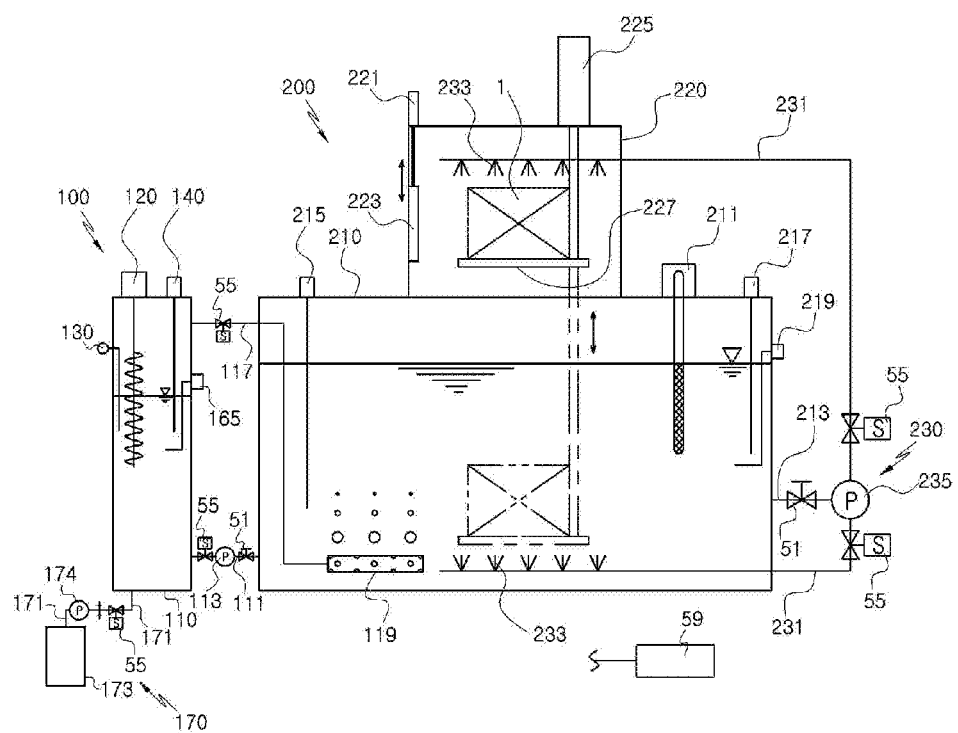

[Fig. 3]
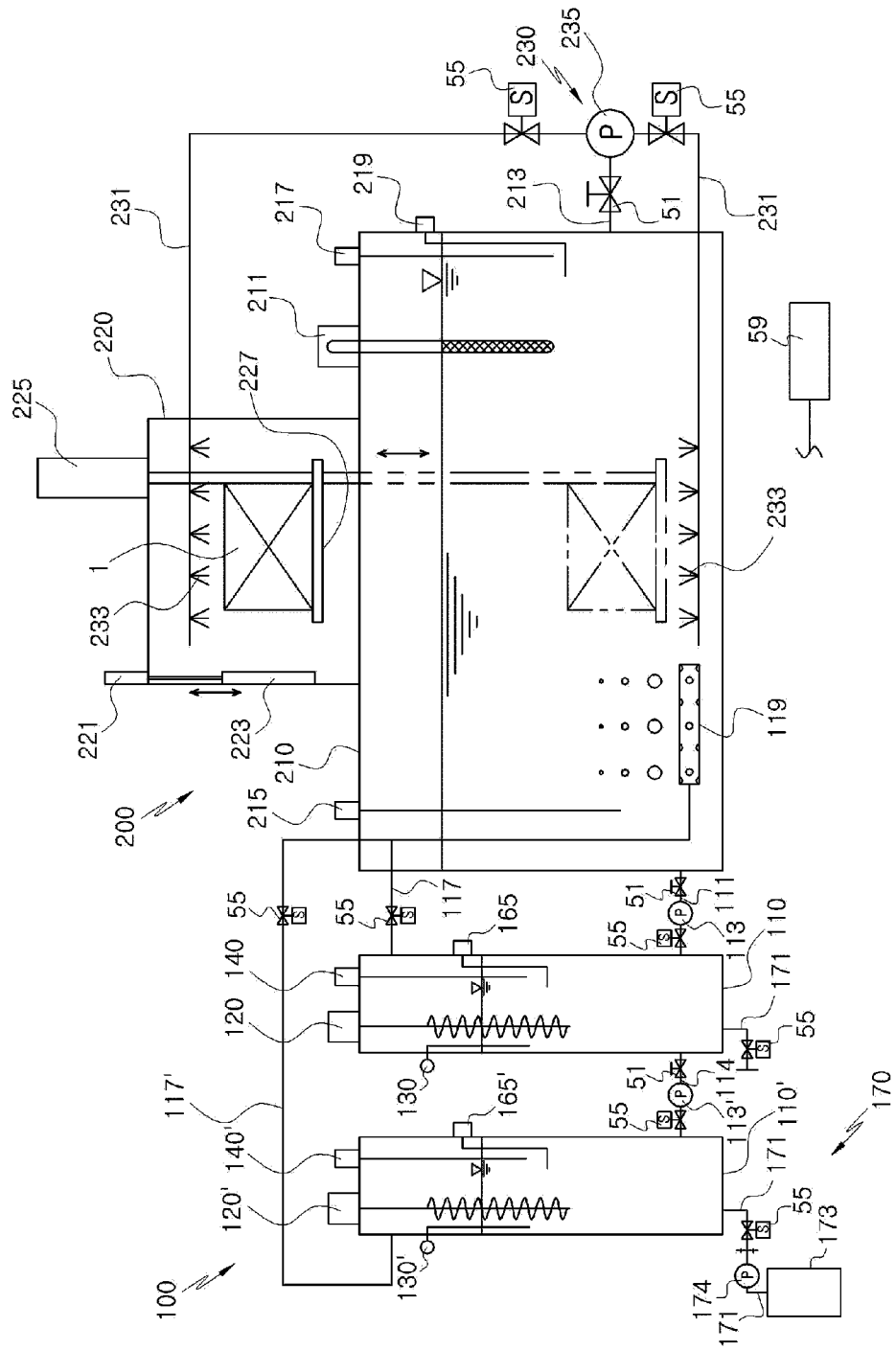

[Fig. 4]
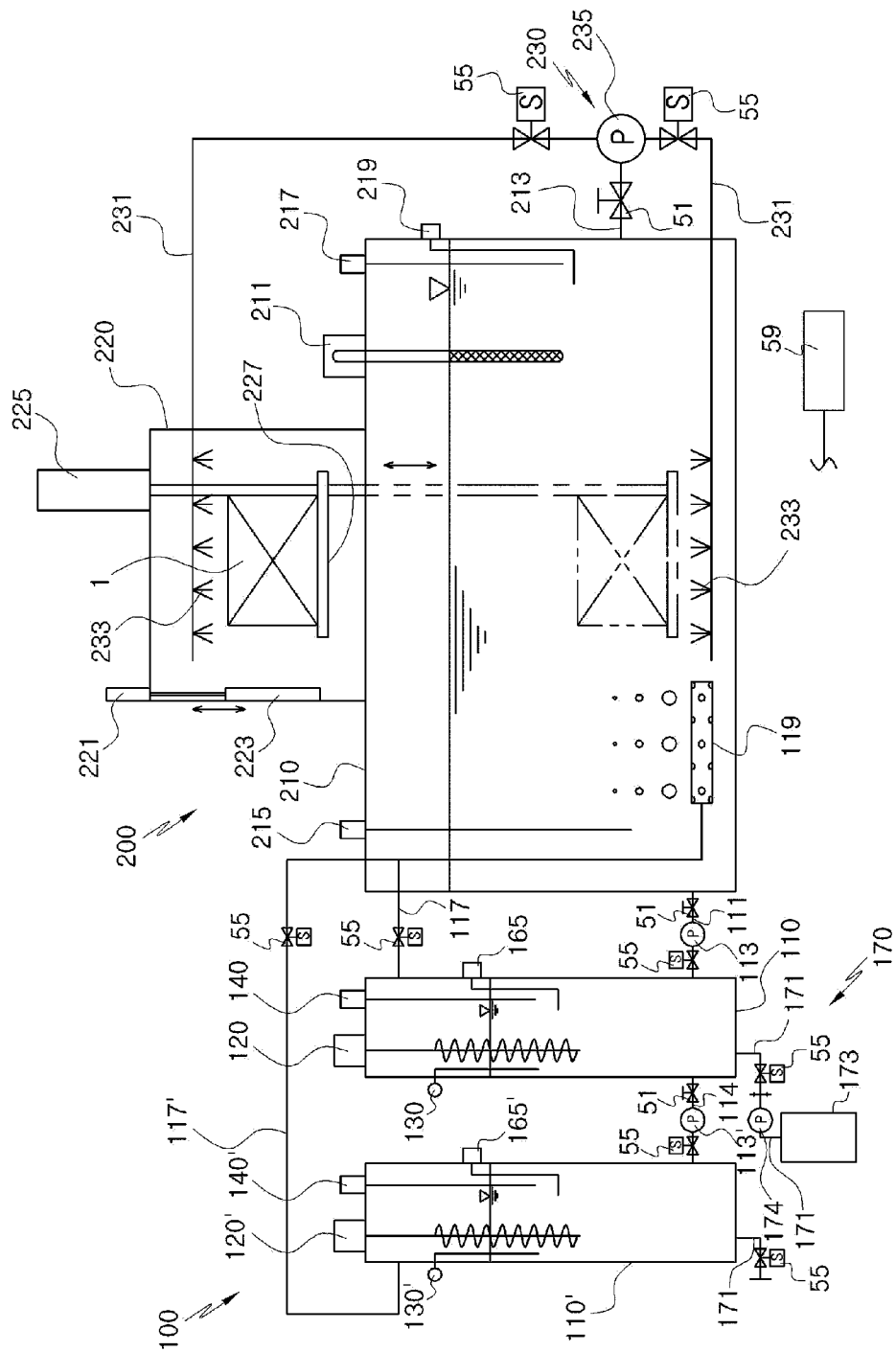

[Fig. 5]
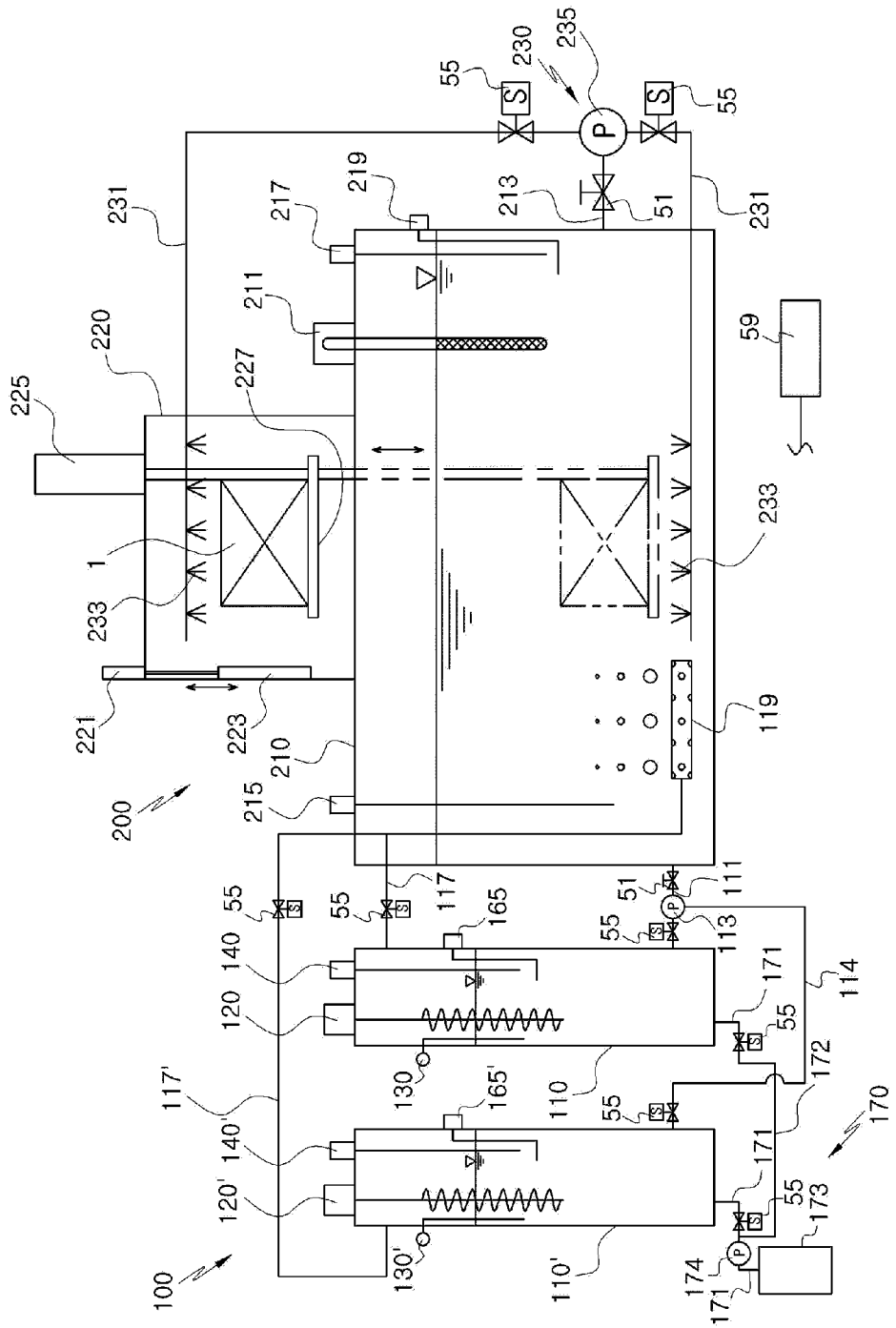

[Fig. 6]
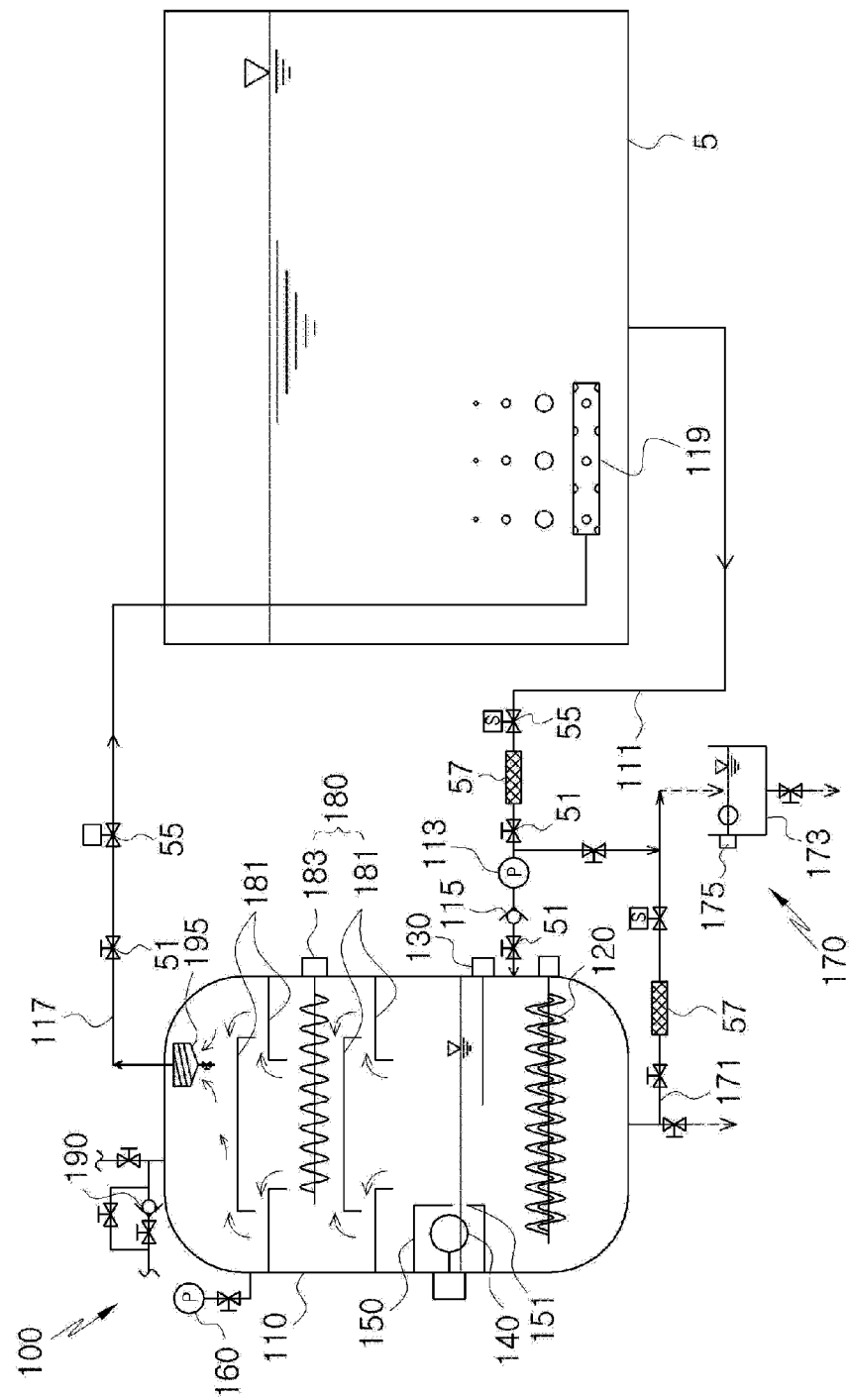

[Fig. 7]
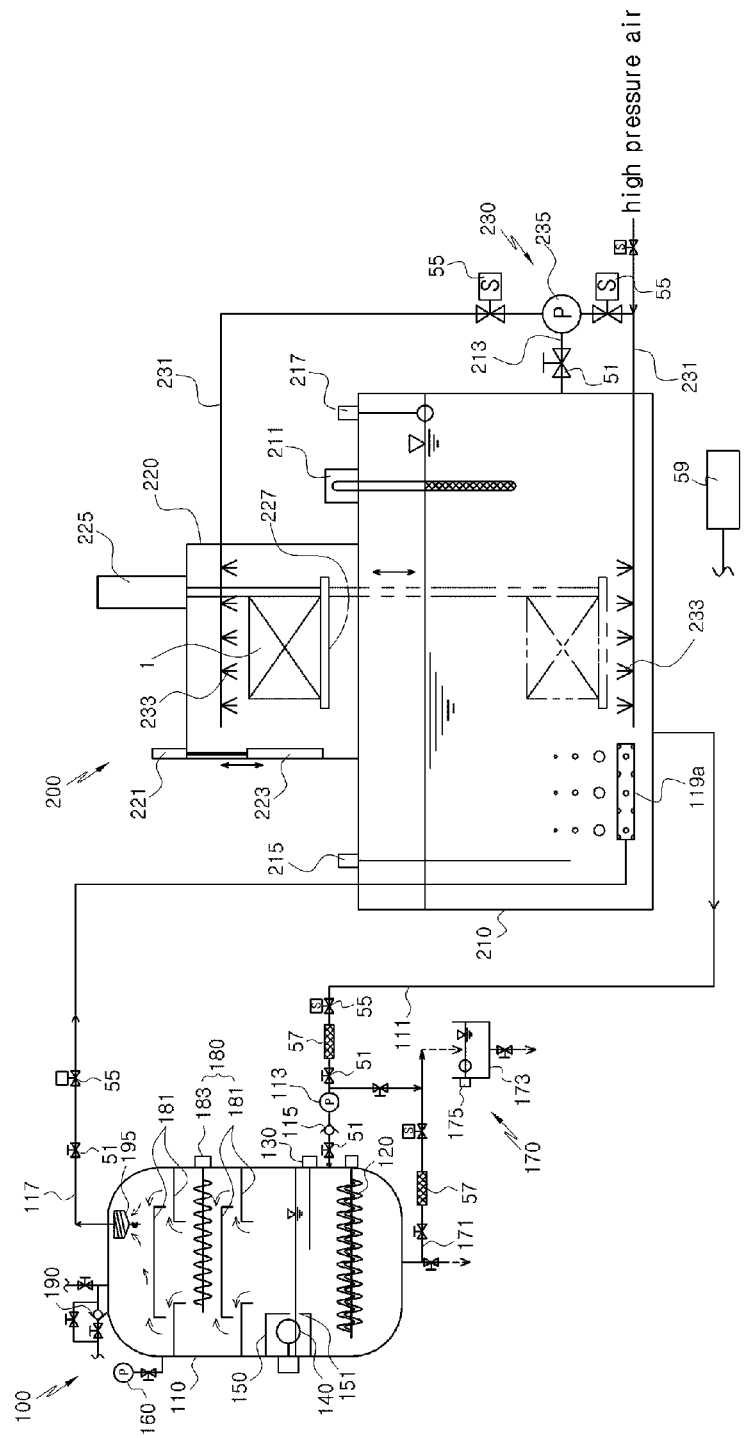

[Fig. 8]
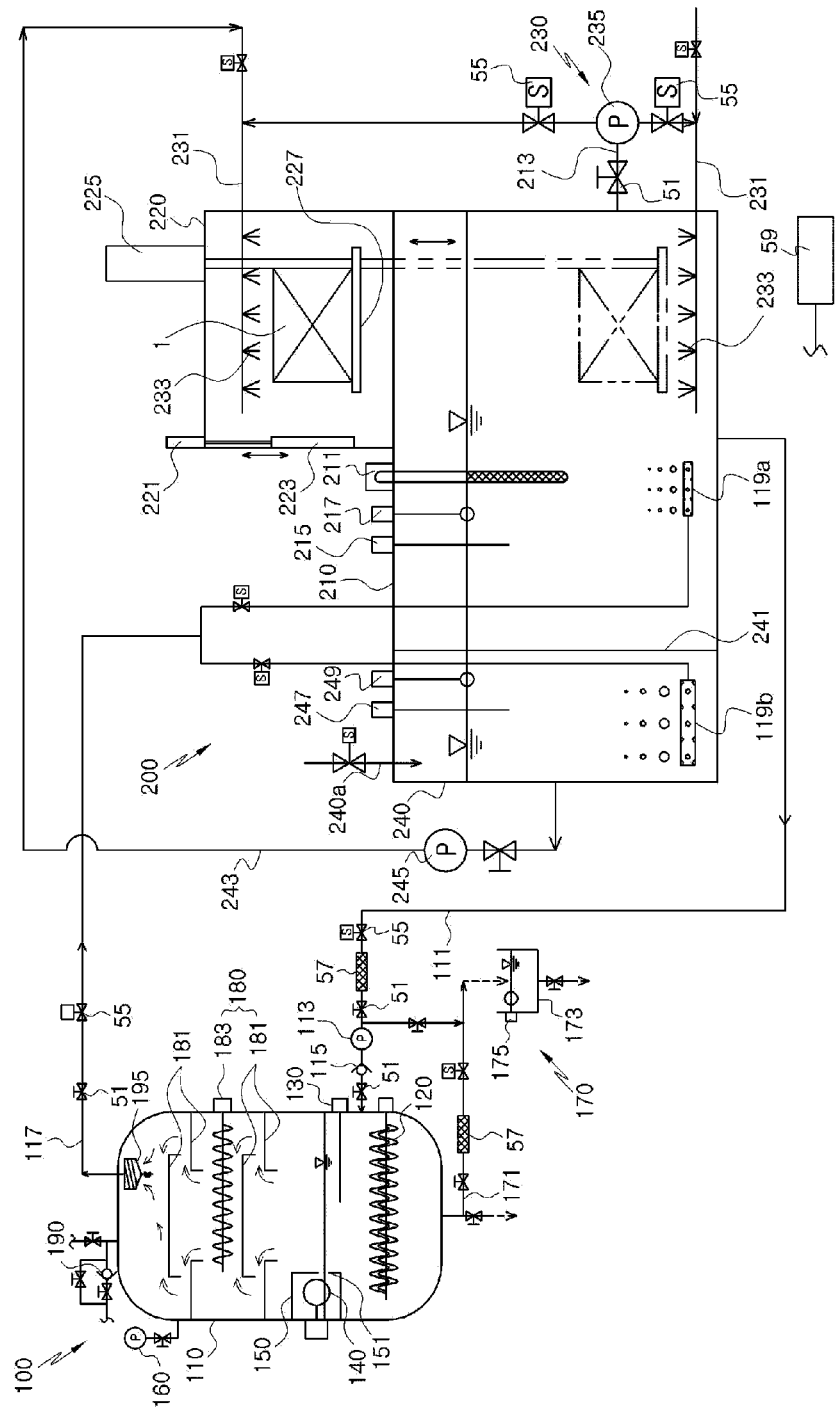

[Fig. 9]
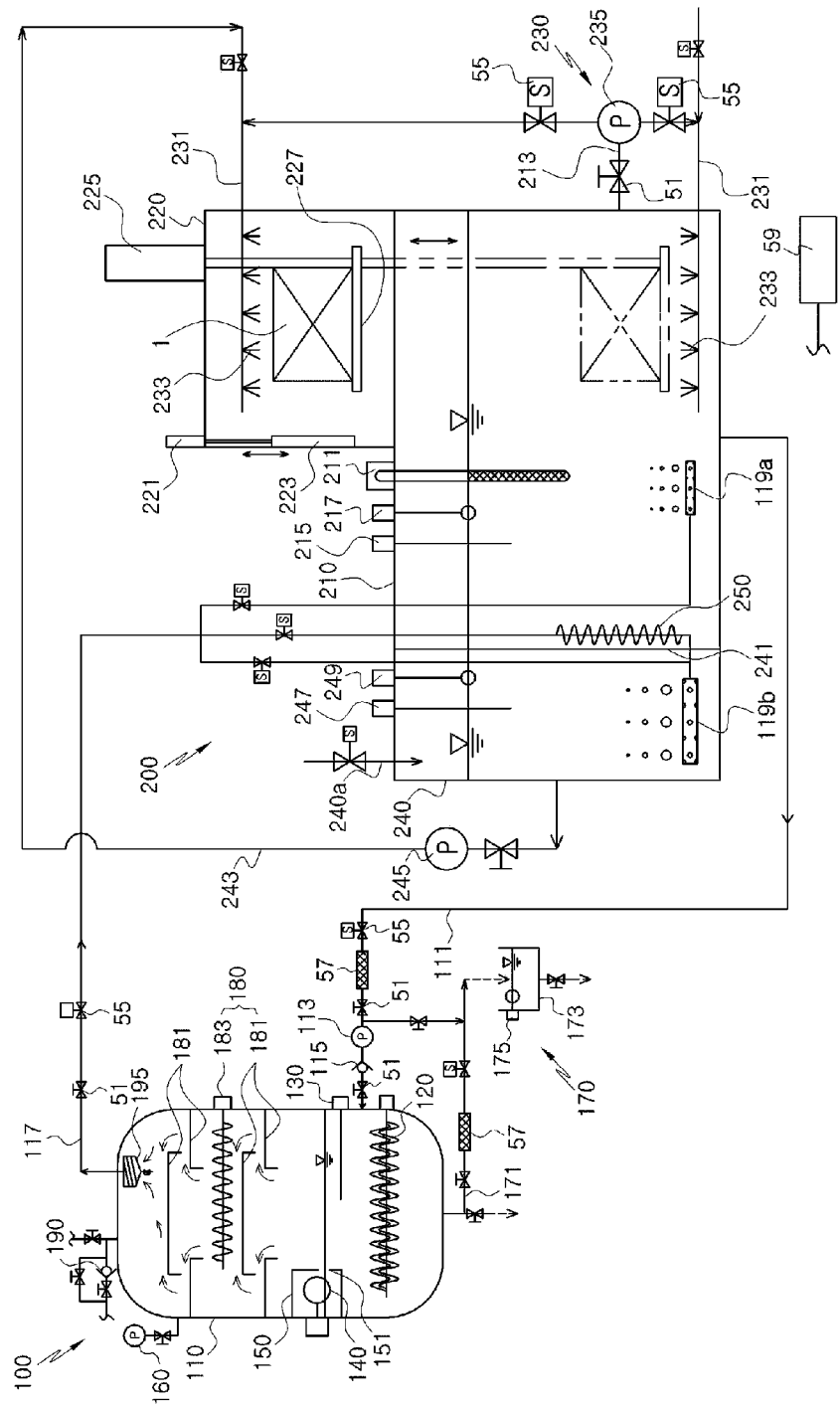

[Fig. 10]
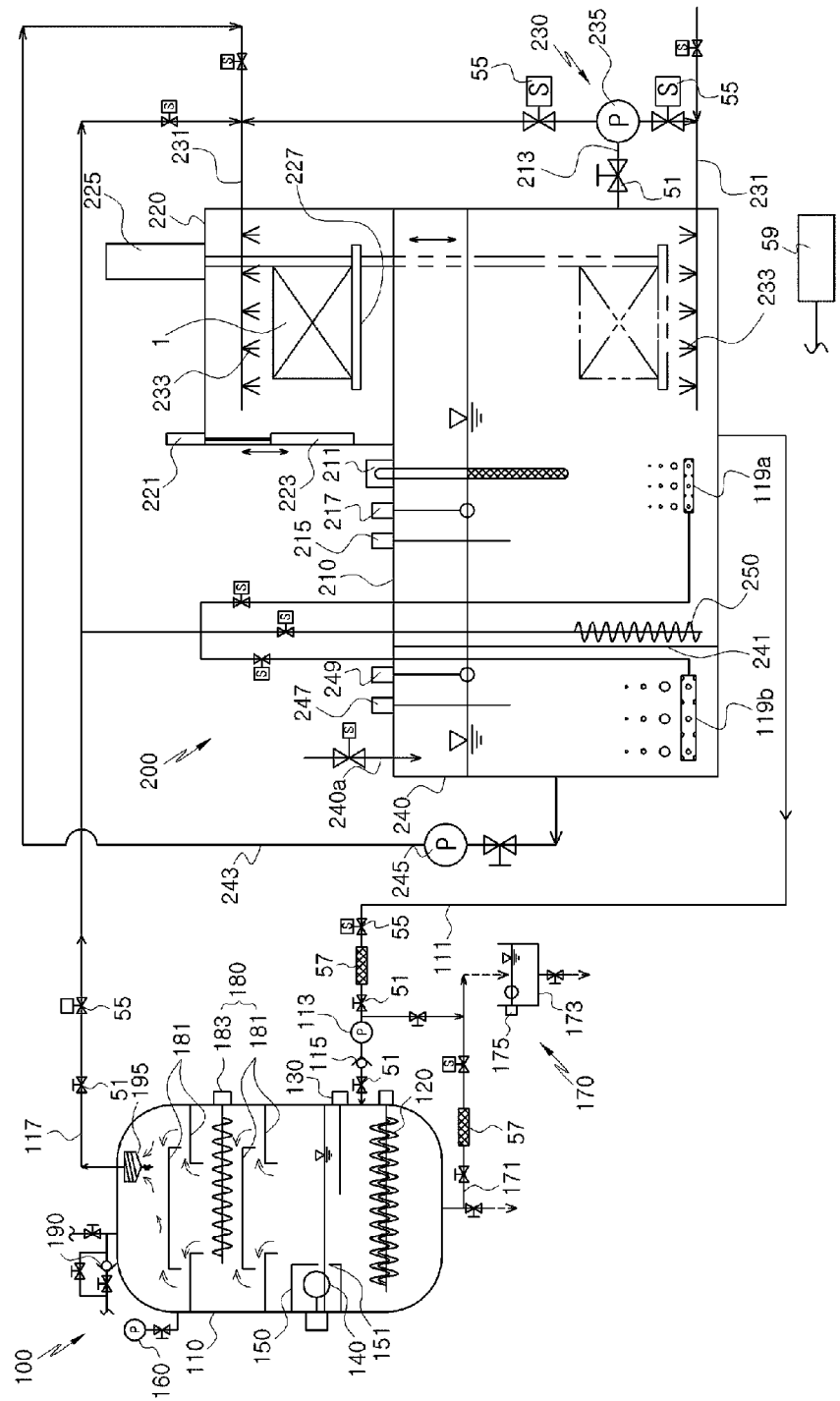

[Fig. 11]
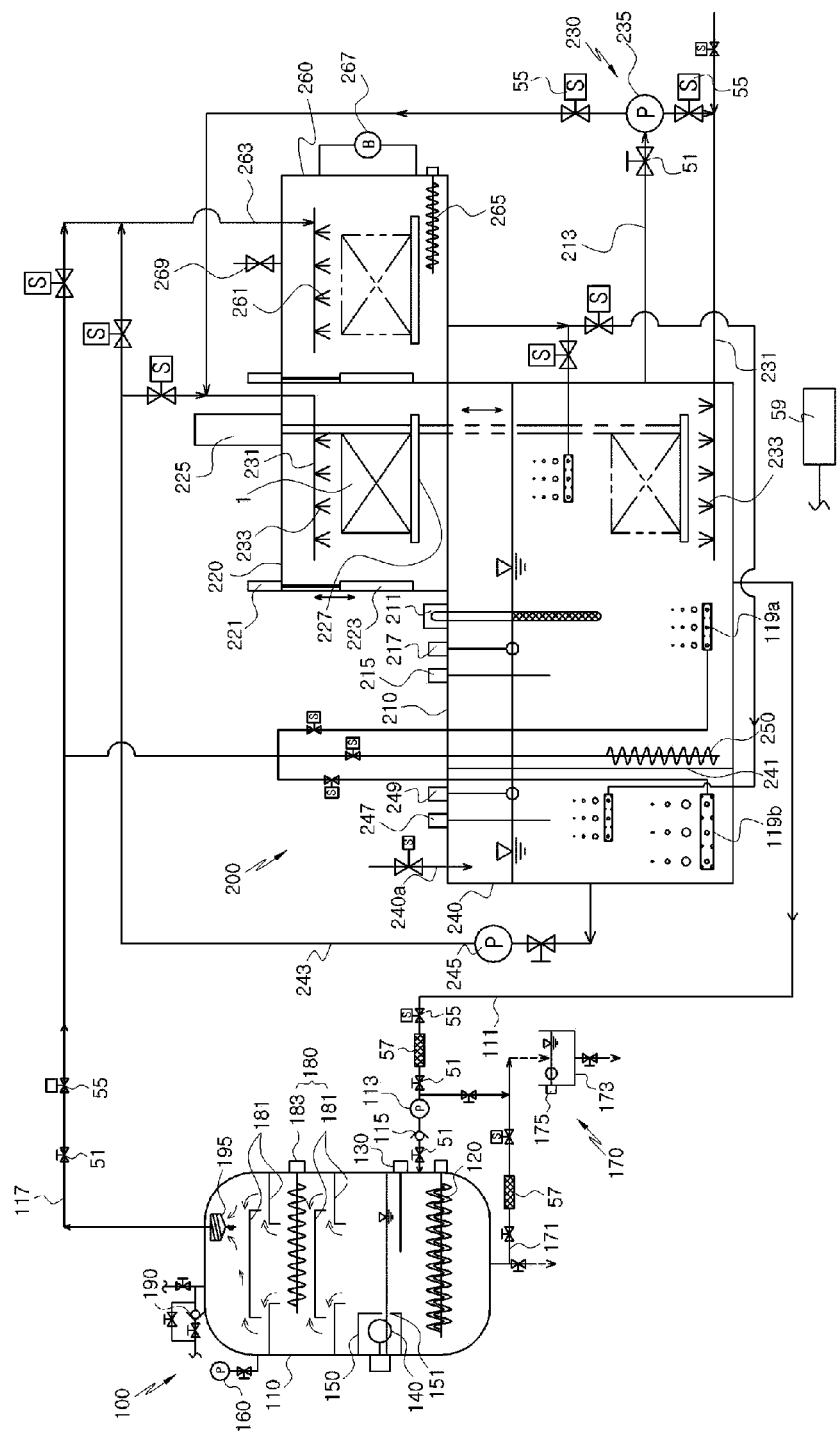

[Fig. 12]
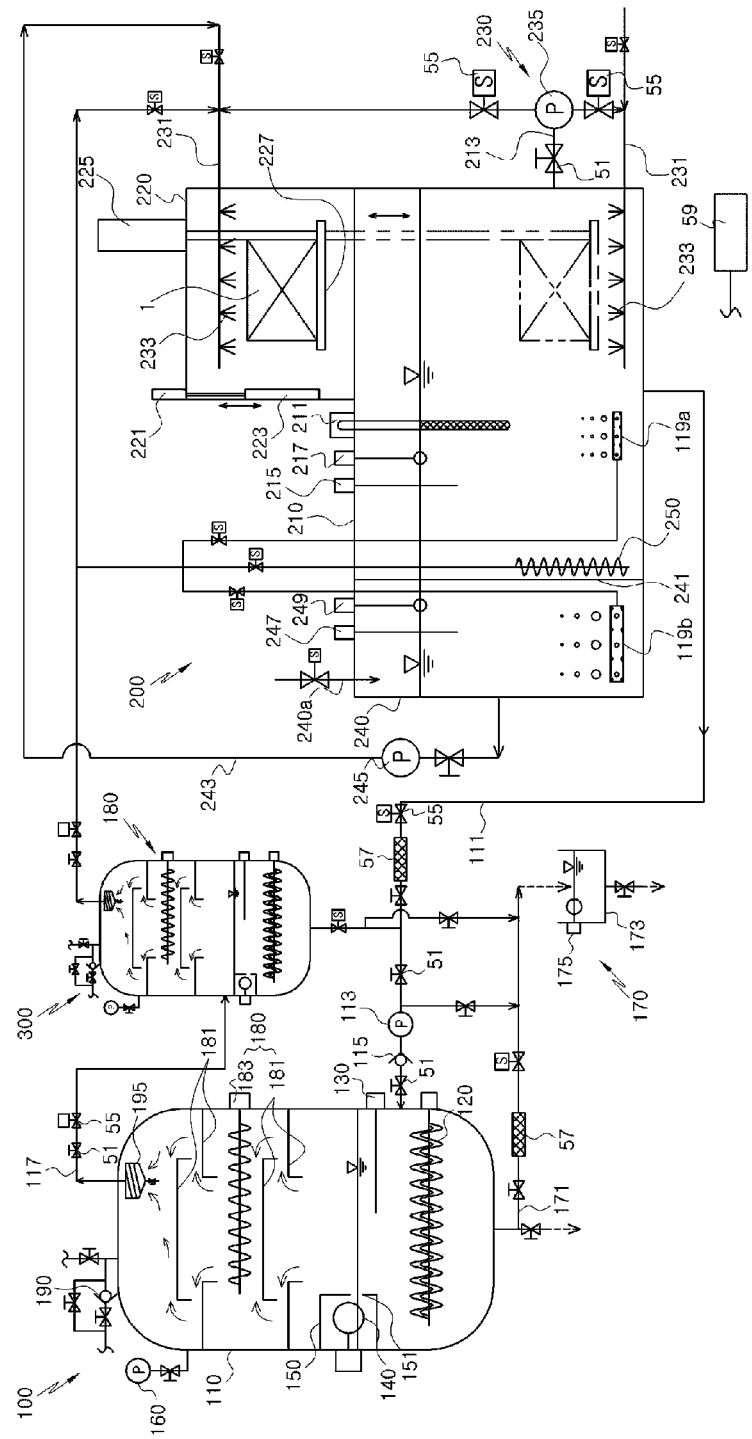

[Fig. 13]
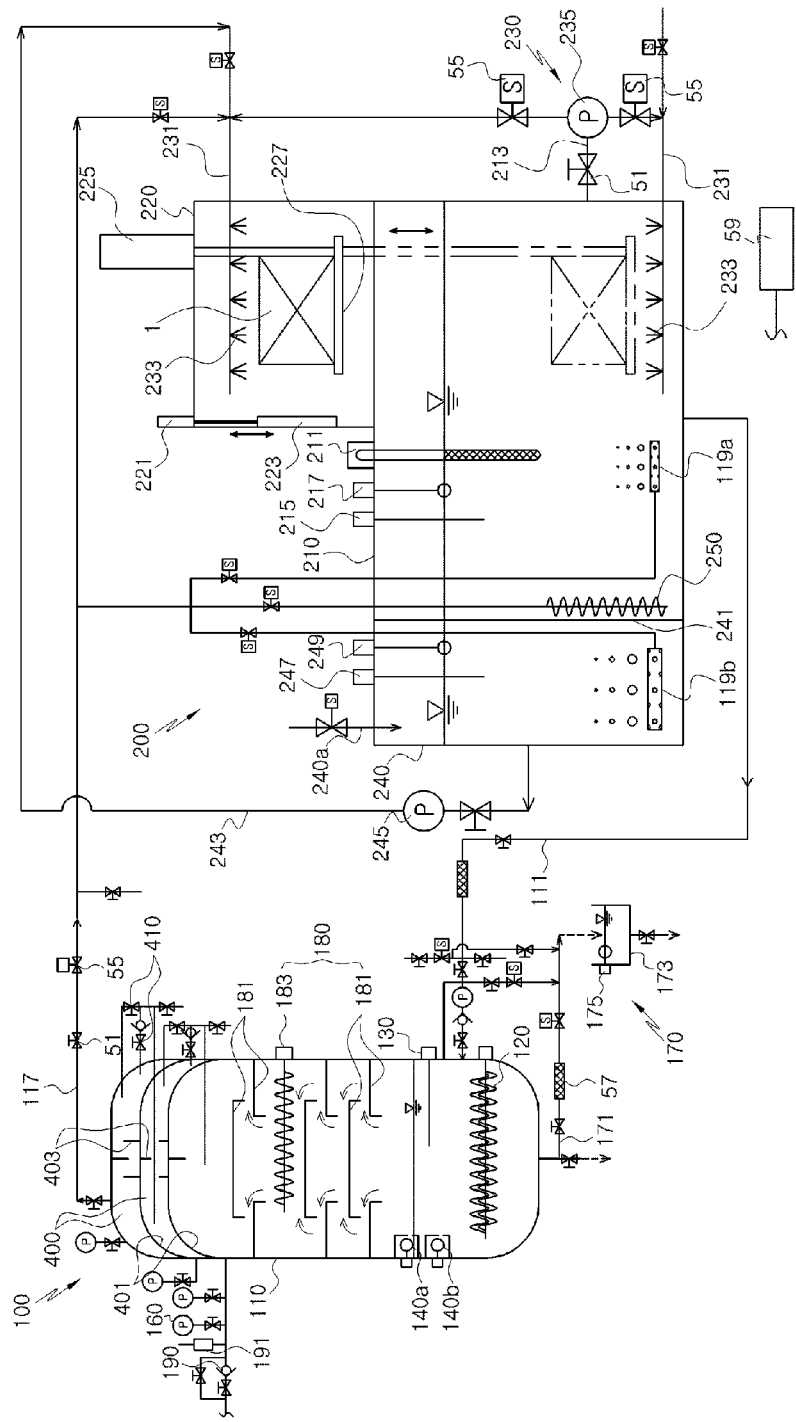

WASTEWATER RECLAMATION APPARATUS AND WASTEWATER-RECYCLING WASHING EQUIPMENT INCLUDING SAME

BACKGROUND

The present invention relates to a wastewater reclamation apparatus and wastewater-recycling washing equipment including the same, and more particularly to a wastewater reclamation apparatus that is connected to a washing tank, a plating tank or a purification tank for immersing an object to be washed, such as a metal product, into washing liquid, such as industrial water or alkali water, and washing the object to be washed, and that can perform reclamation on wastewater, and wastewater-recycling washing equipment including the same.

In general, after undergoing a manufacturing or assembly process, metal products, such as mechanical apparatuses and equipment, which are used at various types of industrial sites are immersed into washing liquid contained inside the washing tank of a washing apparatus, and are then subjected to washing processing.

An example of such a washing apparatus is disclosed in Korean Utility Model Registration No. 20-0255086 (registered on Nov. 12, 2001; hereinafter "Patent document 1").

As shown in FIG. 1, a washing apparatus 10 according to a conventional technology includes a washing tank 20 configured to contain washing liquid therein, and an electric heater 19 integrated with the washing tank 20 to extend into the washing tank 20 so that the capability to wash an object 1 to be washed can be improved by increasing the temperature of the washing liquid.

Reference symbol 21 designates a filter unit, reference symbol 23 designates a temperature sensor, reference symbol 25 designates a level sensor, reference symbol 30 designates an object loading unit, reference symbol 31 designates a door lifting drive unit, reference symbol 33 designates a washing lifting drive unit, reference symbol 11 designates spray nozzles, reference symbol 13 designates spray pipelines, reference symbol 15 designates a manual valve, and reference symbol 17 designates electronic valves.

Meanwhile, equipment including a plating tank or a purification tank, other than a washing tank, may include a means for processing wastewater that is discharged to the outside after contained used water has been processed.

However, the equipment including a washing tank, a plating tank, a purification tank or the like according to a conventional technology has a problem in that the quality of used water processing may be degraded because as the number of times used water is processed increases, used water is more polluted, and, when the pollution increases above a predetermined level, processing capability is degraded or polluted used water may remain and thus cause secondary pollution.

Furthermore, the conventional equipment also has a problem in that maintenance and repair is burdensome and costs may be increased because used water must be periodically replaced in order to maintain the cleanliness level of used water and maintain the quality of used water processing at a predetermined level and so forth.

SUMMARY OF THE INVENTION

An object of the present invention is to provide a wastewater reclamation apparatus that is connected to a washing tank, a plating tank or a purification tank and performs reclamation on wastewater discharged to the outside after used water has been processed, thereby maintaining the used water processing quality of used water processing apparatus at a predetermined level, and wastewater-recycling washing equipment including the same.

Another object of the present invention is to provide a wastewater reclamation apparatus that can facilitate maintenance and repair and reduce costs, and wastewater-recycling washing equipment including the same.

In order to accomplish the above objects, the present invention provides a wastewater reclamation apparatus, including: a reclamation tank configured such that a wastewater intake tube is connected to the lower portion thereof so that wastewater discharged from an external apparatus enters thereinto and is stored therein, a vapor supply tube is connected to the upper portion thereof so that the stored wastewater is heated and then supplied in a vapor form back into used water inside the external apparatus, and a wastewater inflow pump is provided on the wastewater intake tube; a heater provided in the reclamation tank, and configured to heat the wastewater; and a waste sludge discharge assembly provided below the reclamation tank so that wastewater sludge deposited on the bottom of the reclamation tank is discharged to the outside.

In this case, preferably, the wastewater reclamation apparatus further includes a bubble elimination unit provided inside the reclamation tank so that vapor bubbles are eliminated from vapor that rises when the wastewater stored in the reclamation tank is heated.

Preferably, the bubble elimination unit is at least any one of a plurality of protection plates provided on the inner wall of the reclamation tank in an offset manner so that vapor bubbles of the vapor physically collide therewith and burst and a bubble elimination heater configured to burst the vapor bubbles of the vapor with high temperature.

Preferably, a wastewater level gauge configured to detect a level of the wastewater stored inside the reclamation tank is provided in the reclamation tank, and the wastewater level gauge is protected by a level stabilization cover configured to prevent the level from becoming non-uniform as the wastewater stored inside the reclamation tank is heated.

Preferably, a pressure gauge configured to detect a pressure inside the reclamation tank is provided in the reclamation tank, and a pressure recovery check valve configured to recover the pressure inside the reclamation tank to a pressure equal to or higher than an allowable pressure when the pressure inside the reclamation tank is decreased below the allowable pressure is provided in the reclamation tank.

Furthermore, preferably, a liquid separation unit configured such that vapor bubbles or liquid material that have not been completely eliminated by the bubble elimination unit fall along a conic wall while being rotated by centrifugal force and only pure vapor deprived of vapor bubbles or liquid material rises and enters into the vapor supply tube is provided in a portion to which the vapor supply tube is connected inside the reclamation tank.

Meanwhile, in order to accomplish the above objects, the present invention provides wastewater-recycling washing equipment, including: a washing tank configured to contain washing liquid therein, to have a closed top, and to include a filter unit configured to filter out impurities of the contained washing liquid; a washing loading unit provided above the washing tank, and provided with a washing lifting drive unit configured to selectively lift and lower an entering object to be washed so that the object to be washed is immersed into washing liquid contained inside the washing tank; a washing circulation unit provided in at least any one of the washing tank and the washing loading unit, and configured to wash the object to be washed and circulate washing liquid by applying pressure to washing liquid in contact with the object to be washed; and a wastewater reclamation apparatus provided to be separate from the washing tank, provided such that waste washing liquid discharged from the washing tank enters, is heated, and is supplied in a vapor form back into washing liquid inside the washing tank, and provided such that pollutants chemically combined with waste washing liquid are separately stored in a dehydrated state.

In this case, preferably, the wastewater reclamation apparatus includes: a reclamation tank provided to be separate from the washing tank, and connected to the washing tank via a vapor supply tube; a heater provided in the reclamation tank, and configured to heat waste washing liquid; and a waste sludge discharge assembly separately provided to one side of the reclamation tank, and configured such that wastewater sludge deposited on a bottom of the reclamation tank is discharged to the outside and stored therein in the outside.

Preferably, the washing circulation unit includes: a spray nozzle provided inside the washing tank; and a spray pump provided between the washing tank and the spray nozzle so that part of washing liquid contained inside the washing tank is extracted and sprayed via the spray nozzle.

Preferably, the reclamation tank includes a plurality of reclamation tanks provided such that waste washing liquid heated in a reclamation tank first connected to the washing tank sequentially enters into one or more remaining reclamation tanks.

Preferably, the waste sludge discharge assembly includes a waste sludge tank selectively and detachably connected to any one of the plurality of reclamation tanks.

Preferably, the wastewater reclamation apparatus further includes a bubble elimination unit provided inside the reclamation tank so that vapor bubbles are eliminated from vapor that rises when the wastewater stored in the reclamation tank is heated.

Preferably, the spray nozzle is also provided inside the washing loading unit, a reclamation washing liquid storage tank separated by a partition and connected to a reclamation washing liquid circulation pipeline so that the contained reclamation washing liquid is supplied via the spray nozzle provided inside the washing loading unit is provided to one side of the washing tank, and a reclamation aeration nozzle connected to the vapor supply tube is provided inside the reclamation washing liquid storage tank.

Preferably, a washing heat exchange unit connected to the vapor supply tube is provided inside the washing tank.

Preferably, the vapor supply tube is also connected to the spray pipeline provided with the spray nozzle so that vapor is supplied via the spray nozzle provided inside the washing loading unit.

Preferably, a dry chamber configured such that an object washed in the washing tank is transferred thereto and dried therein after being lifted into the washing loading unit and being additionally spray washed is provided behind the washing loading unit, and the vapor supply tube is connected to the vapor nozzle pipeline provided with the vapor spray nozzle so that vapor is sprayed via the vapor spray nozzle provided inside the dry chamber.

Preferably, an additional bubble elimination apparatus maintained at a pressure lower than the pressure of the wastewater reclamation apparatus and additionally provided with the bubble elimination unit therein is provided between the wastewater reclamation apparatus and the washing loading unit.

Furthermore, preferably, one or more multi-stage bubble elimination chambers separated by one or more partition plates are provided in the upper portion of the inside of the reclamation tank, and a vapor pipeline provided with a bubble elimination valve configured to control the amount of vapor to be discharged in order to sequentially reduce internal pressure is connected to each of the multi-stage bubble elimination chambers.

According to the present invention, there can be provided a wastewater reclamation apparatus that is connected to a washing tank, a plating tank or a purification tank and performs reclamation on wastewater discharged to the outside after used water has been processed, thereby maintaining the used water processing quality of used water processing apparatus at a predetermined level, and wastewater-recycling washing equipment including the same.

Furthermore, there can be provided a wastewater reclamation apparatus that can facilitate maintenance and repair and reduce costs, and wastewater-recycling washing equipment including the same.

BRIEF DESCRIPTION OF DRAWINGS

FIG. 1 is a configuration diagram showing the schematic configuration of a washing apparatus according to a conventional technology;

FIG. 2 is a configuration diagram showing the schematic configuration of wastewater-recycling washing equipment to which a wastewater reclamation apparatus according to a first embodiment of the present invention has been applied;

FIGS. 3 and 4 are configuration diagrams showing the schematic configuration of wastewater-recycling washing equipment to which a wastewater reclamation apparatus according to a second embodiment of the present invention has been applied;

FIG. 5 is a configuration diagram showing the schematic configuration of wastewater-recycling washing equipment to which a wastewater reclamation apparatus according to a third embodiment of the present invention has been applied;

FIG. 6 is a configuration diagram showing the schematic configuration of a wastewater reclamation apparatus according to a fourth embodiment of the present invention;

FIG. 7 is a configuration diagram showing the schematic configuration of wastewater-recycling washing equipment according to a fifth embodiment of the present invention;

FIG. 8 is a configuration diagram showing the schematic configuration of wastewater-recycling washing equipment according to a sixth embodiment of the present invention;

FIG. 9 is a configuration diagram showing the schematic configuration of wastewater-recycling washing equipment according to a seventh embodiment of the present invention;

FIG. 10 is a configuration diagram showing the schematic configuration of wastewater-recycling washing equipment according to an eighth embodiment of the present invention;

FIG. 11 is a configuration diagram showing the schematic configuration of wastewater-recycling washing equipment according to a ninth embodiment of the present invention;

FIG. 12 is a configuration diagram showing the schematic configuration of wastewater-recycling washing equipment according to a tenth embodiment of the present invention; and FIG. 13 is a configuration diagram showing the schematic configuration of wastewater-recycling washing equipment according to an eleventh embodiment of the present invention.

| <Description of Reference symbols> | |
| --- | --- |
| 100: wastewater reclamation apparatus | 110: reclamation tank |
| 120: heater | 140: wastewater level gauge |
| 150: level stabilization cover | 160: pressure gauge |
| 170: waste sludge discharge assembly | 180: bubble elimination unit |
| 181: protection plate | 183: bubble elimination heater |
| 190: pressure recovery check valve | 195: liquid separation unit |
| 210: washing tank | 220: washing loading unit |
| 230: washing circulation unit | 240: reclamation washing liquid storage tank |
| 250: washing heat exchange unit | 260: dry chamber |
| 300: additional bubble elimination apparatus | |

DETAILED DESCRIPTION OF THE INVENTION

Prior to the following description, it is noted that in various embodiments, the same reference numerals will be assigned to the same components, the same components will be representatively described in a first embodiment, and descriptions of the same components may be omitted in other embodiments.

The present invention will be described in detail below with reference to the accompanying drawings.

(Embodiment 1)

As shown in FIG. 2, wastewater-recycling washing equipment to which a wastewater reclamation apparatus 100 according to a first embodiment of the present invention has been applied includes the wastewater reclamation apparatus 100, and a washing apparatus 200 configured to include a washing tank 210, a washing loading unit 220, and a washing circulation unit 230.

As shown in FIG. 2, the washing tank 210 contains washing liquid, has a closed top, and includes a filter unit 211 configured to filter out the impurities of washing liquid.

In this case, the washing liquid contained in the washing tank 210 may be industrial water, alkali water, or the like.

It is preferred that the washing tank 210 according to the present invention includes a washing liquid takeout tube 213 connected to one side of the washing tank 210 to extract part of the washing liquid, a washing tank temperature sensor 215 configured to detect the temperature of the contained washing liquid, a washing tank level sensor 217 configured to detect the level of the washing liquid, and a washing tank pollution measurement sensor 219 configured to measure the pollution level of the washing liquid. Meanwhile, the washing tank temperature sensor 215, the washing tank pollution measurement sensor 219, and the washing tank level sensor 217 are connected to a control unit 59.

Accordingly, the control unit 59 may manage the target cleanliness level and target temperature of the washing liquid by controlling the operation of the wastewater inflow pump 113 and heater 120 of the wastewater reclamation apparatus 100 to be described later based on results detected by the washing tank temperature sensor 215 or washing tank pollution measurement sensor 219, and the control unit 59 may manage the appropriate level of the washing liquid by controlling the operation of the wastewater inflow pump 113 based on results detected by the washing tank level sensor 217.

As shown in FIG. 2, the washing loading unit 220 is provided above the washing tank 210, and includes a door 223 configured to be selectively lifted and lowered by a door lifting drive unit 221 and selectively open and close the washing loading unit 220 in front thereof, and a washing lifting drive unit 225 configured to selectively lift and lower the object 1 to be washed so that the entering object 1 to be washed, such as a metal product, can be immersed into the washing liquid contained inside the washing tank 210.

It is preferred that the top of the washing tank 210 according to the present invention is provided to be closed and is preferably provided to communicate with the washing loading unit 220.

A lifting carrier 227 on which an object 1 to be washed put into the washing loading unit 220 is seated is installed on the washing lifting drive unit 225.

The washing circulation unit 230 includes a spray pipeline 231, spray nozzles 233, and a spray pump 235.

The spray nozzles 233 are provided inside the washing tank 210.

It is preferred that the spray nozzles 233 according to the present invention are provided not only in the washing tank 210 but also in the washing loading unit 220.

Accordingly, the object 1 to be washed put into the washing loading unit 220 may be lowered into the washing tank 210 by the driving of the washing lifting drive unit 225, be immersed into the washing liquid, and be first washed in the washing liquid using washing liquid sprayed via the lower spray nozzles 233, and then may be lifted from the washing tank 210 by the driving of the washing lifting drive unit 225, and be washed again in the washing loading unit 220 using washing liquid sprayed via the upper spray nozzles 233 before being carried from the inside of the washing loading unit 220 to the outside.

The spray pipeline 231 connects the washing tank 210 and the spray nozzle 233 and provides a path, through which washing liquid flows, so that the washing liquid inside the washing tank 210 can be sprayed via the spray nozzles 233 by the operation of the spray pump 235.

It is preferred that the spray pipeline 231 according to the present invention includes an upper pipeline extending into the washing loading unit 220 and a lower pipeline extending into the washing tank 210.

The spray pump 235 is provided between the washing tank 210 and the spray nozzle 233 so that part of the washing liquid contained inside the washing tank 210 can be extracted and sprayed via the spray nozzles 233.

It is preferred that the spray pump 235 according to the present invention is provided at a branch between the upper and lower pipelines of the spray pipeline 231 so that washing liquid can be sprayed via the spray nozzle 233 under the control of the control unit 59. In this case, it is preferred that a manual valve 51 is provided on the spray pipeline 231 extending from the washing tank 210 to the spray pump 235, and it is preferred that electronic valves 55, such as solenoid valves or the like, configured to be controlled by the control unit 59 are provided at respective locations adjacent to the spray pump 235 on the upper and lower pipelines extending from the spray pump 235 to the spray nozzle 233.

Accordingly, the inflow of the washing liquid contained inside the washing tank 210 into the spray pipeline 231 may be selectively allowed and blocked via the manual valve 51, and the flow direction of washing liquid in the spray pipeline 231 may be controlled by controlling at least any one of the electronic valves 55 provided on the upper and lower pipelines of the spray pipeline 231, respectively, via the control unit 59 so that the washing liquid can be sprayed via at least any one of the upper spray nozzles 233 and the lower spray nozzles 233.

Meanwhile, the electronic valves 55 according to the present invention may be replaced with manual valves 51 in some cases.

As shown in FIG. 2, the wastewater reclamation apparatus 100 is provided to be separate from the washing tank 210, and is provided such that waste washing liquid discharged from the washing tank 210 can enter, be heated and be supplied back into washing liquid inside the washing tank 210 in the form of vapor and such that pollutants chemically combined with the waste washing liquid can be separately stored in a state free of moisture.

More specifically, as shown in FIG. 2, the wastewater reclamation apparatus 100 includes: a reclamation tank 110 provided separately from the washing tank 210; a wastewater intake tube 111 configured to connect the upper portions of the reclamation tank 110 and the washing tank 210; a wastewater inflow pump 113 provided on the wastewater intake tube 111; a vapor supply tube 117 configured to connect the reclamation tank 110 and the washing tank 210 and extended from the inside of the washing tank 210 to be located below the washing tank 210; a heater 120 provided on the reclamation tank 110, and configured to heat waste washing liquid that enters into the reclamation tank 110; a reclamation tank temperature sensor 130 provided on the reclamation tank 110; and a waste sludge discharge assembly 170 provided below the reclamation tank 110 so that wastewater sludge deposited in the lower portion of the reclamation tank 110 can be discharged to the outside.

The waste sludge discharge assembly 170 includes: a discharge pipeline 171 connected to the bottom of the reclamation tank 110; a discharge tank 173 separately provided to one side of the reclamation tank 110; a waste sludge pump 174 provided on the discharge tank 173; and an electronic valve 55 provided between the reclamation tank 110 and the waste sludge pump 174 so that the discharge flow of waste sludge from reclamation tank 110 can be selectively allowed and blocked.

Accordingly, waste washing liquid polluted during the washing of the object 1 to be washed enters from the washing tank 210 via the wastewater intake tube 111 into the reclamation tank 110, the heater 120 is operated by the operation of the wastewater inflow pump 113, and the waste washing liquid is heated and evaporated inside the reclamation tank 110, thereby allowing a pure water component to be supplied back into the washing liquid inside the washing tank 210 via the vapor supply tube 117 in the form of vapor and also allowing pollutants to be stored in the discharge tank 173 in a dehydrated state.

Furthermore, vapor formed through heating and evaporation by the heater 120 of the wastewater reclamation apparatus 100 and supplied back into washing liquid inside the washing tank 210 via the vapor supply tube 117 has a high temperature, and thus may indirectly heat the washing liquid inside the washing tank 210 via the vapor supply tube 117. Furthermore, the vapor deprived of heat during the indirect heating of the washing liquid is condensed in the washing liquid and included in the washing liquid, thereby minimizing the additional supply of water from the outside.

Meanwhile, it is preferred that a pollution measurement sensor 165 configured to measure the pollution level of the contained waste washing liquid is provided in the reclamation tank 110.

Accordingly, the control unit 59 may more precisely control the operations of the individual components of the wastewater reclamation apparatus 100, such as the wastewater inflow pump 113, the heater 120 and the like, according to the pollution level of the waste washing liquid contained inside the reclamation tank 110.

The washing tank pollution measurement sensor 219 and the pollution measurement sensor 165 may be provided as pH sensors.

Meanwhile, the reclamation tank 110 may further include a pressure sensor, and thus the amount of vapor inside the reclamation tank 110 and the amount of vapor supplied into the washing tank 210 may be controlled by detecting the amount of vapor, generated by the operation of the heater 120, through internal pressure detection and then controlling the electronic valve 55, provided on the vapor supply tube 117, using the control unit 59.

The wastewater inflow pump 113 is provided between the washing tank 210 and the reclamation tank 110 so that the waste washing liquid is discharged from the washing tank 210 and enters into the reclamation tank 110.

The heater 120 is provided on the reclamation tank 110 and heats the waste washing liquid so that the water component of the waste washing liquid entering into the reclamation tank 110 can be converted into vapor through heating and be aerated into the washing liquid inside the washing tank 210 via the vapor supply tube 117 via a natural convection method.

In this case, an aeration nozzle 119 extended from the vapor supply tube 117 to the inside of the washing tank 210 and configured such that a plurality of holes is formed through the outer circumferential surface of the end of the aeration nozzle 119 to be immersed into the washing liquid is provided such that vapor bubbles supplied into the washing liquid via the vapor supply tube 117 generates a vortex inside the washing liquid and thus the capability to wash the object 1 to be washed using the washing liquid may be improved.

The heater 120 according to the present invention may be provided on the reclamation tank 110 in the form of an electric heater reclamation tank 110 to be extended to the inside of the reclamation tank 110 so that the waste washing liquid can be heated and evaporated by increasing the temperature of the waste washing liquid.

Meanwhile, the manual valve 51 is provided on the pipeline of the wastewater intake tube 111 extending from the washing tank 210 to the wastewater inflow pump 113, the electronic valve 55 is provided on the pipeline extending from the wastewater inflow pump 113 to the reclamation tank 110, and the electronic valve 55 is provided on the vapor supply tube 117.

Accordingly, the inflow of the waste washing liquid, contained inside the washing tank 210 and polluted during washing, into the reclamation tank 110 may be selectively controlled by controlling the electronic valve 55 and the wastewater inflow pump 113 provided on the wastewater intake tube 111 using the control unit 59, and the supply of vapor, generated through the heating and evaporation of the waste washing liquid inside the reclamation tank 110, into the washing liquid inside the washing tank 210 may be selectively controlled by controlling the electronic valve 55 provided on the vapor supply tube 117 using the control unit 59.

The reclamation tank temperature sensor 130 is provided on the reclamation tank 110 to detect the temperature of the waste washing liquid that is heated by the heater 120.

Accordingly, the target cleanliness level and target temperature of the washing liquid may be accurately managed by controlling the operations of the wastewater inflow pump 113, the waste sludge pump 174 and the electronic valve 55 using the control unit 59 based on results detected by the reclamation tank temperature sensor 130 or pollution measurement sensor 165 and a wastewater level gauge 140 to be described below.

Meanwhile, it is preferred that the discharge tank 173 according to the present invention is provided to be detachably coupled to the reclamation tank 110 via the discharge pipeline 171 provided below the reclamation tank 110.

For this purpose, it is preferred that the discharge pipeline 171 connected to the discharge tank 173 is detachably connected to the discharge pipeline 171 connected to the bottom of the reclamation tank 110.

The discharge pipeline 171 connected to the discharge tank 173 and the discharge pipeline 171 connected to the bottom of the reclamation tank 110 may be coupled to each other via a flange or a screw coupling.

Meanwhile, the waste sludge pump 174 and the electronic valve 55 are provided on the discharge pipeline 171.

Accordingly, the waste sludge deprived of moisture because the waste washing liquid is heated and evaporated inside the reclamation tank 110 may be selectively discharged and blocked by controlling the electronic valve 55 using the control unit 59, and the waste sludge inside the reclamation tank 110 may enter and be stored in the discharge tank 173 by controlling the waste sludge pump 174 using the control unit 59 in the state in which the discharge tank 173 has been coupled to the reclamation tank 110 via the discharge pipeline 171.

The waste sludge pump 174 is provided on the discharge tank 173 so that the waste sludge can be discharged from the reclamation tank 110 and enter into the discharge tank 173.

That is, it is preferred that the discharge tank 173, the discharge pipeline 171 and the waste sludge pump 174 according to the present invention are provided below the reclamation tank 110 and are detachably coupled to the discharge pipeline 171 provided with the electronic valve 55.

Meanwhile, it is preferred that the wastewater level gauge 140 detects the level of entering waste washing liquid is provided on the reclamation tank 110 according to the present invention.

Accordingly, the appropriate level of the waste washing liquid may be managed by controlling the operations of the wastewater inflow pump 113, the waste sludge pump 174 and the electronic valve 55 using the control unit 59 based on results detected by the wastewater level gauge 140.

Based on the above-described configuration, the operation of the wastewater-recycling washing equipment to which the wastewater reclamation apparatus 100 according to the first embodiment of the present invention has been applied is described with reference to FIG. 2, as follows.

First, when the object 1 to be washed enters into the washing loading unit 220 in the state in which the door 223 has been opened by the operation of the door lifting drive unit 221 of the washing loading unit 220, the door 223 is lowered and closed by the driving of the door lifting drive unit 221, and thus the internal space of the washing loading unit 220 is sealed off from the outside.

Thereafter, the lifting carrier 227 is lowered into the washing tank 210 by the driving of the washing lifting drive unit 225, and thus the object 1 to be washed is immersed into the washing liquid.

Furthermore, the washing liquid is sprayed onto the object 1 to be washed by opening the electronic valve 55 provided on the lower pipeline of the spray pipeline 231 and operating the spray pump 235 via the spray nozzle 233 extended from the washing tank 210 to be located below the washing tank 210 in the state in which the manual valve 51 has been opened.

When a predetermined period has been elapsed after the object 1 to be washed has been immersed into the washing liquid, the object 1 to be washed is lifted from the washing tank 210 by the driving of the washing lifting drive unit 225, and enters into the washing loading unit 220. The washing liquid is sprayed onto the object 1 to be washed via the spray nozzle 233 extending into the washing loading unit 220 by opening the electronic valve 55 provided on the upper pipeline of the spray pipeline 231 and operating the spray pump 235 in the state in which the manual valve 51 has been opened.

When the door 223 is opened by the driving of the door lifting drive unit 221, the object 1 to be washed spray washed in the washing loading unit 220 is carried to the outside of the washing loading unit 220.

The washing of the object 1 to be washed is performed via the above-described process. However, the pollution level of the washing liquid contained inside the washing tank 210 is increased and the washing capability thereof is decreased because impurities are gradually increased by the repetition of the above-described washing process.

In this case, the control unit 59 may determine that the pollution level of the washing liquid is equal to or higher than a reference value if a detected temperature is lower than a set temperature based on results detected by the washing tank temperature sensor 215 configured to detect the temperature of the washing liquid, and then may perform control so that the wastewater inflow pump 113, the heater 120 and the like of the wastewater reclamation apparatus 100 are operated. If the pollution level of the washing liquid detected by the washing tank pollution measurement sensor 219 is equal to or higher than a reference value, the control unit 59 may perform control so that the wastewater inflow pump 113, the heater 120 and the like of the wastewater reclamation apparatus 100 are operated.

More specifically, when the waste washing liquid is made to enter from the washing tank 210 via the wastewater intake tube 111 into the reclamation tank 110 by the operation of the wastewater inflow pump 113, the waste washing liquid is heated and evaporated into vapor inside the reclamation tank 110 by operating the heater 120 using the control unit 59, and the generated vapor is supplied back into the washing tank 210 via the vapor supply tube 117, thereby re-increasing the temperature of the washing liquid.

Meanwhile, a reduction in the level of the waste washing liquid resulting from the generation of the vapor inside the reclamation tank 110 is detected via the wastewater level gauge 140, and is automatically compensated for by the operation of the wastewater inflow pump 113. However, when such compensation is repeated tens of times, the pollution concentration of the waste washing liquid inside the reclamation tank 110 is further increased, and thus a boiling point is also increased.

In this case, if the temperature of the waste washing liquid is detected to reach a reference temperature via the reclamation tank temperature sensor 130 or if the control unit 59 determines that the pollution level of the waste washing liquid detected by the pollution measurement sensor 165 is equal to or higher than a reference value, waste sludge is stored in the discharge tank 173 by operating the waste sludge pump 174.

Accordingly, the wastewater-recycling washing equipment is provided such that the wastewater reclamation apparatus 100 can be separate from the washing tank 210 so that the washing liquid can be continuously purified and thus the washing liquid can be maintained at a predetermined cleanliness level, with the result that the wastewater-recycling washing equipment is provided such that the object 1 to be washed can be maintained at a predetermined washing quality by preventing the washing liquid from being polluted and simultaneously there is no need to frequently replace the washing liquid, thereby facilitating maintenance and repair and also reducing costs through the minimization of the generation of wastewater and the economization of water.

(Embodiment 2)

Wastewater-recycling washing equipment to which a wastewater reclamation apparatus 100 according to a second embodiment of the present invention has been applied is different from that of the first embodiment in that the plurality of reclamation tanks 110 and 110' of the wastewater reclamation apparatus 100 is provided in the wastewater reclamation apparatus 100 and, thus, washing liquid heated and processed in the waste reclamation tank 110 first connected to a washing tank 210 then enters into the remaining reclamation tank 110'.

More specifically, as shown in FIGS. 3 and 4, the wastewater reclamation apparatus 100 according to the second embodiment of the present invention includes the primary reclamation tank 110 first connected to the washing tank 210 via the wastewater intake tube 111, and the secondary reclamation tank 110' connected in series to the primary reclamation tank 110 via a wastewater transfer tube 114.

Meanwhile, reclamation tank temperature sensors are classified into a first reclamation tank temperature sensor 130 and a second reclamation tank temperature sensor 130', the first reclamation tank temperature sensor 130 detects the temperature of waste washing liquid inside the primary reclamation tank 110, and the second reclamation tank temperature sensor 130' detects the temperature of waste washing liquid inside the secondary reclamation tank 110'.

Accordingly, the control unit 59 may separately control the temperatures of the waste washing liquid inside the primary reclamation tank 110 and the secondary reclamation tank 110' based on results detected by the first reclamation tank temperature sensor 130 and the second reclamation tank temperature sensor 130'.

Although the reclamation tanks according to the second embodiment of the present invention are described as two tanks, three or more reclamation tanks may be provided and may be connected in series to each other. Furthermore, a heater, a reclamation tank temperature sensor, a wastewater level gauge, and a pollution measurement sensor may be provided in each of the reclamation tanks. Accordingly, the concentration of waste sludge may be gradually increased while waste washing liquid is passing through the reclamation tanks, and then waste sludge having the highest concentration may be discharged from the final reclamation tank to a discharge tank 173.

Meanwhile, the discharge tank 173 according to the present invention may be provided to be selectively and detachably connected to any one of the plurality of reclamation tanks 110 and 110'.

FIG. 3 is a diagram showing the state in which the discharge tank 173 has been connected to the secondary reclamation tank 110', and FIG. 4 is a diagram showing the state in which the discharge tank 173 has been connected to the primary reclamation tank 110.

Accordingly, when the temperature of the waste washing liquid inside the primary reclamation tank 110 is detected to reach a reference temperature via the reclamation tank temperature sensor 130, waste washing liquid is deprived of moisture in the secondary reclamation tank 110' and then waste sludge is stored in the discharge tank 173 by allowing the waste washing liquid to enter into the secondary reclamation tank 110' through the operation of the wastewater inflow pump 113 provided on the wastewater transfer tube 114, with the result that the wastewater reclamation apparatus 100 is provided such that an increase in the pollution level resulting from the repeated supplement of waste washing liquid in the case of a reduction in the level of waste washing liquid attributable to the generation of vapor inside the primary reclamation tank 110 can be additionally prevented and the washing liquid can be maintained at a predetermined cleanliness level by continuously purifying and circulating the washing liquid, thereby preventing the pollution of the washing liquid and thus maintaining the washing quality of the object 1 to be washed at a predetermined value.

Furthermore, since the components that have not been illustrated in FIGS. 3 and 4 are similar to those of the first embodiment, detailed descriptions thereof are omitted.

(Embodiment 3)

Wastewater-recycling washing equipment to which a wastewater reclamation apparatus 100 according to a third embodiment of the present invention has been applied is different from those of the first or second embodiment in that the plurality of reclamation tanks 110 and 110' of the wastewater reclamation apparatus 100 is connected in parallel to each other and, although a discharge tank 173 is selectively and detachably connected to any one of the plurality of reclamation tanks 110 and 110', the discharge tank 173 is connected in parallel to the remaining reclamation tanks 110 via a waste sludge integration tube 172.

More specifically, as shown in FIG. 5, the wastewater reclamation apparatus 100 according to the third embodiment of the present invention includes the primary reclamation tank 110 first connected to a washing tank 210 via a wastewater intake tube 111 and the secondary reclamation tank 110' connected to the primary reclamation tank 110 via a wastewater transfer tube 114, and the discharge tank 173 connected to the secondary reclamation tank 110' is also connected to the primary reclamation tank 110 via the waste sludge integration tube 172.

Accordingly, when the temperature of waste washing liquid inside the primary reclamation tank 110 is detected to reach a reference temperature via a reclamation tank temperature sensor 130 or when the pollution level of the waste washing liquid inside the primary reclamation tank 110 is measured to reach a reference pollution level via a pollution measurement sensor 165, a control unit 59 performs control so that a waste sludge pump 174 and an electronic valve 55 are operated and thus waste sludge is discharged into the discharge tank 173. When the discharging of the waste sludge has been completed, waste washing liquid is supplied to the primary reclamation tank 110 up to the set reference surface of a waste water level gauge 140 using the wastewater inflow pump 113 and the electronic valve 55, and washing liquid is heated using vapor by evaporating moisture using a heater 120. When the level of the waste washing liquid inside the primary reclamation tank 110 is reduced by the evaporation of the moisture, waste washing liquid is re-supplied from the washing tank 210.

The secondary reclamation tank 110' may be controlled such that the secondary reclamation tank 110' is repeatedly operated like the primary reclamation tank 110 and thus the washing liquid inside the washing tank 210 is maintained at a predetermined cleanliness level.

Furthermore, since the components that are not illustrated in FIG. 5 are similar to those of the first or second embodiment, detailed descriptions thereof are omitted.

Accordingly, according to the present invention, the wastewater-recycling washing equipment is provided such that the wastewater reclamation apparatus 100 is separated from the washing apparatus 200, and thus there is no need to frequently replace washing liquid, maintenance and repair are facilitated, and costs can be reduced through the minimization of the generation of wastewater and the economization of water.

(Embodiment 4)

Meanwhile, a wastewater reclamation apparatus 100 according to a fourth embodiment of the present invention is different from that of any one of the first to third embodiments in that the wastewater reclamation apparatus 100 according to the present embodiment includes a reclamation tank 110, a heater 120, a wastewater level gauge 140, a pressure gauge 160, a waste sludge discharge assembly 170, and a bubble elimination unit 180, as shown in FIG. 6.

As shown in FIG. 6, with regard to the reclamation tank 110, a wastewater intake tube 111 connected to the bottom of an external used water processing apparatus 5 is connected to the lower portion of the reclamation tank so that wastewater discharged from the used water processing apparatus 5 enters into and stored in the reclamation tank 110, a vapor supply tube 117 is connected to the top of the reclamation tank 110 so that wastewater stored in the reclamation tank 110 can be supplied into used water inside the used water processing apparatus 5 after being heated, a wastewater inflow pump 113 is provided on the wastewater intake tube 111, a non-return inflow check valve 115 is provided on the wastewater intake tube 111 downstream of the wastewater inflow pump 113, and a reclamation tank temperature sensor 130 configured to detect the temperature of wastewater heated by the heater 120 is provided inside the reclamation tank 110.

Accordingly, the reclamation tank 110 of the wastewater reclamation apparatus 100 may be connected to the external used water processing apparatus 5, such as a washing apparatus including a washing tank, a plating apparatus including a plating tank or a purification apparatus including a purification tank, and thus wastewater discharged to the outside after used water has been processed may be stored in the reclamation tank 110 so that it can be subjected to reclamation.

The inflow check valve 115 according to the present invention is in charge of the function of maintaining pressure inside the wastewater intake tube 111 at a predetermined level so that wastewater made to enter into the reclamation tank 110 by the wastewater inflow pump 113 can be prevented from flowing backward. A manual valve 51 is disposed on the wastewater intake tube 111 downstream of the wastewater inflow pump 113, a strainer 57 is disposed between the manual valve 51 and an electronic valve 55 downstream of the manual valve 51, and another manual valve 51 is disposed adjacent to a portion where the wastewater intake tube 111 is connected to the reclamation tank 110 and upstream of the inflow check valve 115.

Meanwhile, the vapor supply tube 117 extends into the external used water processing apparatus 5, and an aeration nozzle 119 is provided at an end of the vapor supply tube 117 so that the water component of wastewater entering into the reclamation tank 110 is converted into a vapor form through heating by a heater 120 and is then aerated into used water inside the used water processing apparatus 5 via the vapor supply tube 117 using a natural convection method.

It is preferred that a pressure recovery check valve 190 configured to recover internal pressure back to pressure equal to or higher than allowable pressure when the internal pressure is decreased below the allowable pressure is provided on the reclamation tank 110 according to the present invention.

Accordingly, the internal pressure of the reclamation tank 110 is maintained at a predetermined level by the pressure recovery check valve 190, and thus vapor subjected to reclamation by the wastewater reclamation apparatus 100 can be smoothly supplied and circulated into the used water processing apparatus 5.

Furthermore, a liquid separation unit 195 configured to enable vapor bubbles or liquid material, which are not completely eliminated by the bubble elimination unit 180, to fall along a conic wall while being rotated by centrifugal force and enable sonly pure vapor, from which the vapor bubbles or liquid material have been separated, to be lifted and enter into the vapor supply tube 117 is provided in a portion to which the vapor supply tube 117 is connected inside the reclamation tank 110.

It is preferred that the liquid separation unit 195 according to the present invention is provided as a spiral cyclone in which a spiral inlet is provided.

The heater 120 is provided to extend into the reclamation tank 110, and heat wastewater so that the water component of wastewater entering into the reclamation tank 110 can be converted into a vapor form through heating and be aerated into used water inside the external used water processing apparatus 5 via the vapor supply tube 117 using a natural convection method.

The heater 120 according to the present invention may be provided in the reclamation tank 110 in the form of an electric heater to extend into the reclamation tank 110 so that waste washing liquid can be heated and evaporated by increasing the temperature of waste washing liquid entering into the reclamation tank 110.

The wastewater level gauge 140 is provided in the reclamation tank 110, and detects the level of wastewater stored inside the reclamation tank 110.

Accordingly, the amount of wastewater entering into the reclamation tank 110 and the target cleanliness level and target temperature of used water can be appropriately managed by detecting the level of wastewater inside the reclamation tank 110 via the wastewater level gauge 140 and then controlling the wastewater inflow pump 113 or the electronic valve 55.

It is preferred that the wastewater level gauge 140 according to the present invention is protected by a level stabilization cover 150 that prevent the level of wastewater stored in inside the reclamation tank 110 from becoming non-uniform because the wastewater is heated by the heater 120 and is thus boiled up.

It is preferred that a hole 151 is formed through the level stabilization cover 150 so that wastewater can enter toward the wastewater level gauge 140 protected inside the level stabilization cover 150 and thus the level of the wastewater can be established.

Meanwhile, the hole 151 of the level stabilization cover 150 may be replaced with a side wall in a mesh form.

The pressure gauge 160 is provided on the reclamation tank 110, and detects the internal pressure of the reclamation tank 110.

Accordingly, the amount of vapor inside the reclamation tank 110 and the amount of vapor supplied into the used water processing apparatus 5 may be controlled by detecting the amount of vapor generated by the operation of the heater 120 through the detection of internal pressure and then controlling the electronic valve 55 provided on the vapor supply tube 117.

The waste sludge discharge assembly 170 is separately provide to one side of the reclamation tank 110, and thus enables wastewater sludge deposited on the bottom of the reclamation tank 110 to be discharged to the outside and contains the wastewater sludge in the outside.

More specifically, as shown in FIG. 6, the waste sludge discharge assembly 170 is provided below the reclamation tank 110 so that wastewater sludge deposited on the bottom of the reclamation tank 110 can be discharged to the outside, and includes a discharge pipeline 171 connected to the bottom of the reclamation tank 110, a discharge tank 173 configured such that the wastewater sludge discharged from the reclamation tank 110 enters thereto via the discharge pipeline 171 and is stored therein, and a waste sludge level gauge 175 provided on the discharge tank 173 and configured to detect the level of the wastewater sludge stored in the discharge tank 173.

Accordingly, when wastewater polluted during the processing of used water in the external used water processing apparatus 5 is made to enter from the used water processing apparatus 5 via the wastewater intake tube 111 into the reclamation tank 110 by the operation of the wastewater inflow pump 113, the heater 120 may be operated and thus the wastewater may be heated and evaporated inside the reclamation tank 110, with the result that a pure water component may be supplied in a vapor form back into used water inside the used water processing apparatus 5 via the vapor supply tube 117 and the remaining pollutants may be stored in the discharge tank 173 in a dehydrated state.

It is preferred that another strainer 57 is provided on the discharge pipeline 171 between the manual valve 51 and the electronic valve 55.

Meanwhile, the bubble elimination unit 180 is provided inside the reclamation tank 110 above the wastewater level gauge 140 so that vapor bubbles can be eliminated from vapor that is generated when wastewater stored inside the reclamation tank 110 is heated.

It is preferred that the bubble elimination unit 180 according to the present invention is at least any one of a plurality of protection plates 181 provided on the inner wall of the reclamation tank 110 in an offset manner so that the vapor bubbles of vapor physically collide therewith and burst and a bubble elimination heater 183 configured to burst the vapor bubble of vapor with high temperature.

That is, although the bubble elimination unit 180 may be composed of only the plurality of protection plates 181, only the bubble elimination heater 183 or the combination of the plurality of protection plates 181 and the bubble elimination heater 183, a case where the bubble elimination unit 180 is composed of the combination of the plurality of protection plates 181 and the bubble elimination heater 183 is described in the present specification.

Accordingly, vapor rising when wastewater is heated inside the reclamation tank 110 by the heater 120 physically comes into contact with the plurality of protection plates 181 disposed in an offset manner while passing therethrough, and thus vapor bubbles burst and are eliminated. Although liquid materials still remaining in the vapor pass through the gaps between the plurality of protection plates 181 and rise in the form of a column of water, they come into contact with the bubble elimination heater 183 and are heated and eliminated with high temperature. Finally, only a component similar to pure vapor passes through the liquid separation unit 195 connected to the upper portion of the reclamation tank 110, and is supplied to the external used water processing apparatus 5 via the vapor supply tube 117. Accordingly, the used water processing quality of the used water processing apparatus 5 may be maintained at a predetermined level by recycling wastewater, discharged to the outside after used water has been processed in a washing tank, a plating tank, a purification tank or the like, via the wastewater reclamation apparatus 100.

Although each of the protection plates 181 may be provided as a plate whose both ends are bent downward, it may be provided in a form in which a plurality of rod members cross each other in a complicated manner and a space between upper and lower portions can continue via a small gap through which vapor can pass.

It is preferred that the bubble elimination heater 183 according to the present invention is provided as an electric heater in a mesh or spiral form.

Furthermore, since the components that are not illustrated in FIG. 6 are similar to those of any one of the first to third embodiments, detailed descriptions thereof are omitted.

(Embodiment 5)

Meanwhile, as shown in FIG. 7, wastewater-recycling washing equipment according to a fifth embodiment of the present invention includes a wastewater reclamation apparatus 100 and a washing apparatus 200, and the washing apparatus 200 includes a washing tank 210, a washing loading unit 220, and a washing circulation unit 230.

The washing apparatus 200 of the wastewater-recycling washing equipment according to the fifth embodiment of the present invention is described first, as follows:

As shown in FIG. 7, the washing tank 210 contains washing liquid therein, has a closed top, and includes a filter unit 211 configured to filter out impurities from the contained washing liquid. A washing liquid takeout tube 213 connected to the washing circulation unit 230 and configured to extract part of the washing liquid contained inside the washing tank 210 is connected to one side of the washing tank 210.

In this case, the washing liquid contained inside the washing tank 210 is used water, and may be industrial water, alkali water, or the like.

It is preferred that the washing tank 210 according to the present invention includes a washing tank temperature sensor 215 configured to detect the temperature of the contained washing liquid and a washing tank level sensor 217 configured to detect the level of washing liquid. Meanwhile, the washing tank temperature sensor 215 and the washing tank level sensor 217 are connected to a control unit 59. Furthermore, the washing tank 210 may further include a washing tank pollution measurement sensor configured to measure the pollution level of washing liquid and transfer the results of the measurement to the control unit 59.

Accordingly, the target cleanliness level and target temperature of washing liquid may be managed by controlling the operations of the wastewater inflow pump 113 and heater 120 of the wastewater reclamation apparatus 100 using the control unit 59 based on results detected by the washing tank temperature sensor 215 or washing tank pollution measurement sensor, and the appropriate level of the washing liquid may be managed by controlling the operation of the wastewater inflow pump 113 using the control unit 59 based on results detected by the washing tank level sensor 217.

As shown in FIG. 7, the washing loading unit 220 is provided above the washing tank 210, and includes a door 223 configured to be selectively lifted and lowered by a door lifting drive unit 221 and selectively open and close the washing loading unit 220 and a washing lifting drive unit 225 configured to selectively lift and lower an object 1 to be washed so that the entering object 1 to be washed, such as a metal product, can be immersed into washing liquid contained inside the washing tank 210.

It is preferred that the top of the washing tank 210 according to the present invention is provided to be closed and communicate with the washing loading unit 220.

A lifting carrier 227 configured such that the object 1 to be washed entering into the washing loading unit 220 is seated thereon is mounted on the washing lifting drive unit 225.

Meanwhile, although not shown, it is preferred that a transfer means, such as a conveyer belt, is provided below the lifting carrier 227 or the object 1 to be washed and thus the object 1 to be washed can be transferred in a lateral direction.

As shown in FIG. 7, a washing circulation unit 230 is provided on at least any one of the washing tank 210 and the washing loading unit 220, and washes the object 1 to be washed and circulates washing liquid by applying pressure onto the washing liquid in contact with the object 1 to be washed. The washing circulation unit 230 includes a spray pipeline 231 configured to provide a circulation path through which part of washing liquid is sprayed because a washing liquid takeout tube 213 is connected thereto, spray nozzles 233 provided inside the washing tank 210, and a spray pump 235 provided between the washing tank 210 and the spray nozzles 233 so that part of the washing liquid contained inside the washing tank 210 can be extracted and sprayed via the spray nozzles 233.

It is preferred that high-pressure air is supplied to one side of the spray pipeline 231 according to the present invention from the outside.

Meanwhile, although the washing circulation unit 230 according to the present invention is described as including the spray nozzles 233 and the spray pump 235, the washing circulation unit 230 may be provided as a means for generating air bubbles inside the washing tank 210 or a means for generating a vortex inside the washing liquid contained inside the washing tank 210 using a whirlpool method.

It is preferred that the spray nozzles 233 according to the present invention are also provided inside the washing loading unit 220.

Accordingly, the object 1 to be washed entering into the washing loading unit 220 may be lowered into the washing tank 210 by the driving of the washing lifting drive unit 225, be immersed into washing liquid, and then be previously washed with washing liquid sprayed via lower spray nozzles 233 inside the washing liquid, and, thereafter, may be lifted from the washing tank 210 by the driving of the washing lifting drive unit 225, and be re-washed with washing liquid sprayed via upper spray nozzles 233 inside the washing loading unit 220 before being transferred from the inside of the washing loading unit 220 to the outside.

The spray pipeline 231 connects the washing tank 210 and the spray nozzle 233 and then provides a path through which washing liquid flows so that the washing liquid inside the washing tank 210 can be sprayed via the spray nozzles 233 by the operation of the spray pump 235.

It is preferred that the spray pipeline 231 according to the present invention includes an upper pipeline extending into the washing loading unit 220 and a lower pipeline extending into the washing tank 210.

It is preferred that the spray pump 235 according to the present invention is provided at a location where the upper pipeline and lower pipeline of the spray pipeline 231 are branched off so that washing liquid can be sprayed via the spray nozzle 233 under the control of the control unit 59. In this case, electronic valves 55, such as solenoid valves, configured to be controlled by the control unit 59 are provided on the upper and lower pipelines, respectively, extending from the spray nozzle 233 to the spray pump 235, at locations adjacent to the spray pump 235.

Accordingly, the flow direction of washing liquid in the spray pipeline 231 may be controlled by controlling at least any one of the electronic valves 55 provided on the upper and lower pipelines of the spray pipeline 231 via the control unit 59 so that washing liquid can be sprayed via at least any one of the upper spray nozzles 233 and the lower spray nozzles 233.

Meanwhile, the electronic valves 55 according to the present invention may be replaced with manual valves 51 in some cases.

As shown in FIG. 7, the wastewater reclamation apparatus 100 is provided separately from the washing tank 210. The wastewater reclamation apparatus 100 includes: a reclamation tank 110 connected to the washing tank 210 via a vapor supply tube 117 provided in the upper portion of reclamation tank 210 so that waste washing liquid discharged from the washing tank 210 can enter thereto and be stored therein and the stored waste washing liquid can be heated and be supplied in a vapor form back into washing liquid inside the washing tank 210 via a washing aeration nozzle 119a; a heater 120 provided in the reclamation tank 110 and configured to heat waste washing liquid; a waste sludge discharge assembly 170 provided such that pollutants chemically combined with waste washing liquid can be separately discharged in a dehydrated state; and a bubble elimination unit 180 provided inside the reclamation tank 110 so that vapor bubbles can be eliminated from vapor that rises when waste washing liquid stored inside the reclamation tank 110 is heated.

The reclamation tank 110 is provided separately from the washing tank 210. A wastewater intake tube 111 is connected to the lower portion of the reclamation tank 110 so that waste washing liquid discharged from the washing tank 210 can enter into and be stored in the reclamation tank 110, a wastewater inflow pump 113 is provided on the wastewater intake tube 111, and an inflow check valve 115 is provided on the wastewater intake tube 111 downstream of the wastewater inflow pump 113.

Accordingly, the inflow of waste washing liquid, contained inside the washing tank 210 and polluted during washing, into the reclamation tank 110 may be selectively controlled by controlling the electronic valve 55 and the wastewater inflow pump 113, provided on the wastewater intake tube 111, using the control unit 59, and the supply of vapor, generated when the waste washing liquid inside the reclamation tank 110 is heated and evaporated, into washing liquid inside the washing tank 210 may be selectively controlled by controlling the electronic valve 55, provided on the vapor supply tube 117, using the control unit 59.

Furthermore, the reclamation tank temperature sensor 130 is provided in the reclamation tank 110 so that the temperature of waste washing liquid stored inside the reclamation tank 110 and heated by the heater 120, a wastewater level gauge 140 is provided to detect the level of the waste washing liquid stored inside the reclamation tank 110, and a pressure gauge 160 is provided to detect pressure inside the reclamation tank 110.

Accordingly, the target cleanliness level and target temperature of the washing liquid may be precisely managed by controlling the operation of the wastewater inflow pump 113 or electronic valve 55 using the control unit 59 based on results detected by the reclamation tank temperature sensor 130 or wastewater level gauge 140, and the amount of vapor inside the reclamation tank 110 and the amount of vapor supplied into the washing tank 210 may be controlled by detecting the amount of vapor, generated by the operation of the heater 120, through the detection of internal pressure and then controlling the electronic valve 55, provided on the vapor supply tube 117, using the control unit 59.

The heater 120 is provided in the reclamation tank 110 and heats waste washing liquid so that the water component of the waste washing liquid entering into the reclamation tank 110 can be converted into a vapor form by heating and be aerated into the washing liquid inside the washing tank 210 via the vapor supply tube 117 using a natural convection method.

In this case, it is preferred that the washing aeration nozzle 119 extended from the vapor supply tube 117 into the washing tank 210 and provided with a plurality of holes formed in the circumferential surface of an end thereof immersed into washing liquid is provided such that vapor bubbles supplied into the washing liquid via the vapor supply tube 117 can form a vortex inside the washing liquid and the capability to wash the object 1 to be washed with washing liquid can be improved.

Accordingly, vapor is supplied from the wastewater reclamation apparatus 100 via the washing aeration nozzle 119$a$ into the washing liquid contained inside the washing tank 210, heats the washing liquid, and is condensed, thereby continuously maintaining washing liquid in a clean state.

The heater 120 according to the present invention may be provided in the reclamation tank 110 to extend into the reclamation tank 110 in the form of an electric heater so that waste washing liquid can be heated and evaporated by increasing the temperature of the waste washing liquid entering into the reclamation tank 110.

As shown in FIG. 7, the waste sludge discharge assembly 170 includes a discharge pipeline 171 connected to the bottom of the reclamation tank 110, a discharge tank 173 separately provided to one side of the reclamation tank 110, and a manual valve 51 and an electronic valve 55 provided on the discharge pipeline 171 so that the discharge flow of waste sludge from the reclamation tank 110 can be selectively opened and closed.

Accordingly, when waste washing liquid polluted during the washing of the object 1 to be washed enters from the washing tank 210 via the wastewater intake tube 111 into the reclamation tank 110 by the operation of the wastewater inflow pump 113, the heater 120 is operated and thus waste washing liquid is heated and evaporated inside the reclamation tank 110, with the result that a pure water component $\stackrel{\triangle}{=}$ vapor may be supplied in a vapor form back into washing liquid inside the washing tank 210 via the vapor supply tube 117 and remaining pollutants may be stored in the discharge tank 173 in a dehydrated state.

Furthermore, the vapor heated and evaporated by the heater 120 of the wastewater reclamation apparatus 100 and supplied back into the washing liquid inside the washing tank 210 via the vapor supply tube 117 has high temperature, and may indirectly heat the washing liquid inside the washing tank 210 via the vapor supply tube 117. Furthermore, the vapor deprived of heat during the indirect heating of the washing liquid is condensed into the washing liquid and is included in the washing liquid, thereby minimizing the additional supply of water from the outside.

Meanwhile, it is preferred that the discharge tank 173 according to the present invention is provided to be detachably coupled to the reclamation tank 110 via the discharge pipeline 171 provided below the reclamation tank 110.

Accordingly, waste sludge deprived of moisture because waste washing liquid is heated and evaporated inside the reclamation tank 110 may be selectively discharged or prevented from being discharged by controlling the electronic valve 55 using the control unit 59, and waste sludge inside the reclamation tank 110 is made to enter into and stored in the discharge tank 173 by controlling the electronic valve 55 using the control unit 59 in the state in which the discharge tank 173 has been connected to the discharge pipeline 171.

It is preferred that the bubble elimination unit 180 is at least any one of a plurality of protection plates 181 provided on the inner wall of the reclamation tank 110 in an offset manner so that the vapor bubbles of vapor physically collide therewith and burst and a bubble elimination heater 183 configured to burst the vapor bubble of vapor with high temperature.

In the present specification, the bubble elimination unit 180 is described as being composed of the combination of the plurality of protection plates 181 and the bubble elimination heater 183.

Based on the above-described configuration, the operating process of the wastewater-recycling washing equipment according to the fifth embodiment of the present invention is described with reference to FIG. 7, as follows.

First, when the object 1 to be washed enters into the washing loading unit 220 in the state in which the door 223 has been opened by the operation of the door lifting drive unit 221, the door 223 of the washing loading unit 220 is lowered and closed by the driving of the door lifting drive unit 221, and thus the internal space of the washing loading unit 220 is sealed from the outside.

Thereafter, the lifting carrier 227 is lowered into the washing tank 210 by the driving of the washing lifting drive unit 225, and thus the object 1 to be washed is immersed into washing liquid.

Furthermore, the washing liquid is sprayed onto the object 1 to be washed via the spray nozzles 233 extending to be located across the lower portion of the inside of the washing tank 210 by operating the spray pump 235 provided on the lower pipeline of the spray pipeline 231.

When a predetermined period has elapsed after the object 1 to be washed had been immersed into the washing liquid, the object 1 to be washed is lifted from the washing tank 210 and is also made to enter back into the washing loading unit 220 by the driving of the washing lifting drive unit 225, and washing liquid is sprayed onto the object 1 to be washed via the spray nozzles 233 extending into the washing loading unit 220 by operating the spray pump 235 provided on the upper pipeline of the spray pipeline 231.

The object 1 to be washed that has been spray washed in the washing loading unit 220 is transferred to the outside of the washing loading unit 220 when the door 223 is opened by the driving of the door lifting drive unit 221.

The washing of the object 1 to be washed is performed via the above-described process. However, as the above-described washing is repeatedly performed, the washing liquid contained inside the washing tank 210 has increasing impurities, has an increasing pollution level, and thus has decreasing washing capability.

In this case, the control unit 59 may determine that the pollution level of the washing liquid is equal to or higher than a reference value if detected temperature is lower than set temperature based on results detected by the washing tank temperature sensor 215 configured to detect the temperature of the washing liquid, and may perform control so that the wastewater inflow pump 113 and heater 120 of the wastewater reclamation apparatus 100 are operated.

More specifically, when waste washing liquid enters from the washing tank 210 via the reclamation tank 110 into the wastewater intake tube 111 by the operation of the wastewater inflow pump 113, the control unit 59 operates the heater 120 so that the waste washing liquid is heated and evaporated into vapor inside the reclamation tank 110 and the generated vapor is supplied into the washing tank 210 via the vapor supply tube 117, thereby re-increasing the temperature of the washing liquid.

Meanwhile, a reduction in the level of the waste washing liquid resulting from the generation of the vapor inside the reclamation tank 110 is detected via the wastewater level gauge 140, and is automatically compensated for by the operation of the wastewater inflow pump 113. However, when such compensation is repeated tens of times, the pollution concentration of the waste washing liquid inside the reclamation tank 110 is further increased, and thus a boiling point is also increased.

In this case, when the control unit 59 determines via the reclamation tank temperature sensor 130 that the temperature of the waste washing liquid has reached a reference temperature, the control unit 59 operates the electronic valve 55 so that waste sludge can be stored in the discharge tank 173. Furthermore, the waste sludge may be stored in the discharge tank 173 at regular intervals using a timer.

Meanwhile, when wastewater is heated inside the reclamation tank 110 by the heater 120 and rises in the form of vapor, the vapor physically comes into contact with the plurality of protection plates 181 disposed in an offset manner while passing therethrough, and thus vapor bubbles inside the vapor burst and are eliminated. Although liquid materials still remaining in the vapor pass through the gaps between the plurality of protection plates 181 and rise, they come into contact with the bubble elimination heater 183 and are heated and eliminated with high temperature. Finally, only a component similar to pure vapor passes through the liquid separation unit 195 connected to the upper portion of the reclamation tank 110, and is supplied into the washing liquid contained inside the washing tank 210 via the vapor supply tube 117.

Accordingly, the wastewater-recycling washing equipment is provided such that the wastewater reclamation apparatus 100 can be separate from the washing tank 210 so that the washing liquid can be continuously purified and thus the washing liquid can be maintained at a predetermined cleanliness level, with the result that the wastewater-recycling washing equipment is provided such that the object 1 to be washed can be maintained at a predetermined washing quality by preventing the washing liquid from being polluted and simultaneously there is no need to frequently replace the washing liquid, thereby facilitating maintenance and repair and also reducing costs through the minimization of the generation of wastewater and the economization of water.

Furthermore, since the components that are not illustrated in FIG. 7 are similar to those of any one of the first to fourth embodiments, detailed descriptions thereof are omitted.

(Embodiment 6)

As shown in FIG. 8, wastewater-recycling washing equipment according to a sixth embodiment of the present invention is different from that of any one of the first to fifth embodiments in that the wastewater-recycling washing equipment according to the present embodiment includes a reclamation washing liquid storage tank 240 divided by a partition 241 on one side of a washing tank 210, connected to a reclamation washing liquid circulation pipeline 243 so that the contained reclamation washing liquid can be supplied via a spray nozzle 233 provided inside a washing loading unit 220, and configured to condense and store vapor that is generated when waste washing liquid is evaporated, and a reclamation aeration nozzle 119b connected to the vapor supply tube 117 inside the reclamation washing liquid storage tank 240.

More specifically, the vapor supply tube 117 of the wastewater reclamation apparatus 100 extends into the washing tank 210 and the reclamation washing liquid storage tank 240, and pure vapor supplied from the reclamation tank 110 via the vapor supply tube 117 is supplied to both the washing tank 210 and the reclamation washing liquid storage tank 240 via the washing aeration nozzle 119a and the reclamation aeration nozzle 119b. A fresh washing liquid supply pipeline 240a is provided in the reclamation washing liquid storage tank 240, and thus washing water cleaner than the washing liquid contained inside washing tank 210 is stored inside the reclamation washing liquid storage tank 240. The clean washing water contained inside the reclamation washing liquid storage tank 240 is supplied to the spray pipeline 231 provided with the spray nozzle 233 via the reclamation washing liquid circulation pipeline 243 by the driving of the reclamation washing liquid circulation pump 245 provided on the reclamation washing liquid circulation pipeline 243.

It is preferred that the reclamation washing liquid storage tank 240 according to the sixth embodiment of the present invention includes a reclamation washing liquid temperature sensor 247 configured to detect the temperature of reclamation washing liquid, and a reclamation washing liquid level sensor 249 configured to detect the level of the reclamation washing liquid.

Accordingly, the object 1 to be washed is primarily washed with high-pressure air bubbling via the lower spray nozzles 233 by the driving of the spray pump 235 in the state of being immersed into washing liquid inside the washing tank 210, is lifted from the washing tank 210 by the driving of the washing lifting drive unit 225 and secondarily spray washed via the upper spray nozzles 233 by the driving of the spray pump 235 before being taken from the inside of the washing loading unit 220 (the secondary washing may be omitted when required), is thirdly spray washed with clean washing water contained inside the reclamation washing liquid storage tank 240 via the upper spray nozzle 233 by the driving of the reclamation washing liquid circulation pump 245, and is transferred to the outside of the washing loading unit 220, thereby further improving the washing quality of the object 1 to be washed.

Furthermore, since the components that are not illustrated in FIG. 8 are similar to those of any one of the first to fifth embodiments, detailed descriptions thereof are omitted.

(Embodiment 7)

As shown in FIG. 9, wastewater-recycling washing equipment according to a seventh embodiment of the present invention is different from that of any one of the first to sixth embodiments in that a washing heat exchange unit 250 connected to a vapor supply tube 117 is included inside a washing tank 210.

In this case, the condensed reclamation washing liquid may be supplied to the reclamation washing liquid storage tank 240.

Accordingly, the washing heat exchange unit 250 increases the temperature of the washing liquid by exchanging heat with the washing liquid inside the washing liquid in the washing tank 210 using the heat of the vapor supplied from the reclamation tank 110 via the vapor supply tube 117, thereby further improving the washing performance of the washing liquid.

Furthermore, since the components that are not illustrated in FIG. 9 are similar to those of any one of the first to sixth embodiments, detailed descriptions thereof are omitted.

(Embodiment 8)

As shown in FIG. 10, wastewater-recycling washing equipment according to an eighth embodiment of the present invention is different from that of any one of the first to seventh embodiments in that a vapor supply tube 117 is also connected to an upper spray pipeline 231 provided with a spray nozzle 233 so that vapor can be supplied via a spray nozzle 233 provided inside the washing loading unit 220.

Accordingly, the object 1 to be washed is primarily washed with high-pressure air bubbling via the lower spray nozzles 233 by the driving of the spray pump 235 in the state of being immersed into washing liquid inside the washing tank 210, is lifted from the washing tank 210 by the driving of the washing lifting drive unit 225 and secondarily spray washed via the upper spray nozzles 233 by the driving of the spray pump 235 before being taken from the inside of the washing loading unit 220, is thirdly spray washed with clean washing water contained inside the reclamation washing liquid storage tank 240 via the upper spray nozzle 233 by the driving of the reclamation washing liquid circulation pump 245, is dried with high-temperature vapor supplied from the wastewater reclamation apparatus 100 via the vapor supply tube 117 and sprayed via the upper spray nozzle 233, and deprived of remaining washing liquid, and is transferred to the outside of the washing loading unit 220, thereby further improving the washing quality of the object 1 to be washed without using separate equipment or causing energy consumption.

Furthermore, since the components that are not illustrated in FIG. 10 are similar to those of any one of the first to seventh embodiments, detailed descriptions thereof are omitted.

(Embodiment 9)

As shown in FIG. 11, wastewater-recycling washing equipment according to a ninth embodiment of the present invention is different from that of any one of the first to eighth embodiments in that a dry chamber 260 configured such that the object 1 to be washed washing tank 210 is transferred thereto and dried therein after the washed object 1 has been lifted into the washing loading unit 220 and additionally spray washed is included behind a washing loading unit 220 and a vapor supply tube 117 is also connected to a vapor nozzle pipeline 263 provided with a vapor spray nozzle 261 so that vapor is supplied via the vapor spray nozzle 261 provided inside the dry chamber 260.

Accordingly, the object 1 to be washed is primarily washed with high-pressure air bubbling via the lower spray nozzles 233 by the driving of the spray pump 235 in the state of being immersed into washing liquid inside the washing tank 210, is lifted from the washing tank 210 by the driving of the washing lifting drive unit 225 and secondarily spray washed via the upper spray nozzles 233 by the driving of the spray pump 235 before being taken from the inside of the washing loading unit 220, is thirdly spray washed with clean washing water contained inside the reclamation washing liquid storage tank 240 via the upper spray nozzle 233 by the driving of the reclamation washing liquid circulation pump 245, is transferred such that the object 1 to be washed is loaded inside the dry chamber 260, dried with high-temperature vapor supplied from the wastewater reclamation apparatus 100 via a vapor supply tube 117 and a vapor nozzle pipeline 263, sprayed via a vapor spray nozzle 261 and deprived of remaining washing liquid, and is transferred from the dry chamber 260 via the washing loading unit 220 to the outside, thereby further improving the washing quality of the object 1.

Meanwhile, a dry heater 265 or a circulation means, such as an air circulation blower 267, capable of circulating air inside the dry chamber 260 may be provided inside the dry chamber 260 in order to further speed up drying inside the dry chamber 260, and a vent valve 269 configured to discharge vapor filling the dry chamber 260 to the outside may be further included above the dry chamber 260.

Furthermore, since the components that are not illustrated in FIG. 11 are similar to those of any one of the first to eighth embodiments, detailed descriptions thereof are omitted.

(Embodiment 10)

As shown in FIG. 12, wastewater-recycling washing equipment according to a tenth embodiment of the present invention is different from that of any one of the first to ninth embodiments in that an additional bubble elimination apparatus 300 maintained at a pressure lower than the pressure of a wastewater reclamation apparatus 100 and additionally provided with a bubble elimination unit 180 is provided between the wastewater reclamation apparatus 100 and a washing loading unit 220 so that vapor heated inside a reclamation tank 110 first connected to a washing tank 210 can sequentially enter into the additional bubble elimination apparatus 300.

Accordingly, although bubbles or liquid material are not completely eliminated from and remain in vapor supplied from the reclamation tank 110 of the wastewater reclamation apparatus 100 via a vapor supply tube 117, the vapor enters into the additional bubble elimination apparatus 300 and is deprived of the bubbles with internal low pressure, and the liquid material is completely evaporated by the bubble elimination unit 180, thereby supplying only purer vapor free of impurities to a washing apparatus 200.

Furthermore, since the components that are not illustrated in FIG. 12 are similar to those of any one of the first to ninth embodiments, detailed descriptions thereof are omitted.

(Embodiment 11)

As shown in FIG. 13, wastewater-recycling washing equipment according to an eleventh embodiment of the present invention is different from that of any one of the first to tenth embodiments in that at least one or more multi-stage bubble elimination chambers 400 separated by at least one or more partition plates 401 are provided in the upper portion of the inside of a reclamation tank 110 and a vapor pipeline provided with a bubble elimination valve 410 configured to control the amount of vapor to be discharged in order to sequentially reduce internal pressure is connected to each of the multi-stage bubble elimination chambers 400.

More specifically, as shown in FIG. 13, when two multi-stage bubble elimination chambers 400 are vertically provided, vapor filling the reclamation tank 110 enters via the vapor pipeline connected to the lower multi-stage bubble elimination chamber 400. In this case, the amount of entering vapor is controlled via the lower bubble elimination valve 410, the pressure of the lower multi-stage bubble elimination chamber 400 is reduced below that of the reclamation tank 110, bubbles are eliminated due to expansion and a reduction in temperature resulting from the difference in pressure, and the vapor enters via the vapor pipeline connected to the upper multi-stage bubble elimination chamber 400. In the same manner, the amount of entering vapor is secondarily controlled via the upper bubble elimination valve 410, the pressure of the upper multi-stage bubble elimination chamber 400 is reduced below that of the lower multi-stage bubble elimination chamber 400, and bubbles are more completely eliminated due to the difference in pressure. Thereafter, the vapor is transferred to a washing apparatus 200.

Meanwhile, pollutants that are generated in the multi-stage bubble elimination chamber 400 when bubbles burst and are eliminated may be drained into a discharge tank 173 via a check valve. Pressure reduction partitions 403 configured to partially block the flow of vapor, collide with bubbles and reduce internal pressure may be provided on the tops and bottoms of the partition plates 401. Wastewater level gauges provided in the lower portion of the reclamation tank 110 may include an upper level gauge 140*a* configured to detect the upper limit level of waste washing liquid, and a lower level gauge 140*b* configured to detect the lower limit level of waste washing liquid. A safety valve 191 may be provided adjacent to the pressure recovery check valve 190.

Accordingly, a means for eliminating bubbles is provided inside the reclamation tank 110 in an internal unit form. Although bubbles or liquid material have not been completely eliminated from and remain in vapor supplied from the reclamation tank 110 of the wastewater reclamation apparatus 100 via a vapor supply tube 117, the vapor enters into the multi-stage bubble elimination chambers 400, the bubbles are eliminated with internal low pressure, and the liquid material is completely evaporated by the bubble elimination valves 410. Accordingly, only purer vapor free of impurities may be supplied to a washing apparatus 200.

Furthermore, since the components that are not illustrated in FIG. 13 are similar to those of any one of the first to tenth embodiments, detailed descriptions thereof are omitted.

As a result, according to the present invention, there is no need to frequently replace washing liquid, maintenance and repair can be facilitated, and costs can be reduced through the minimization of the generation of wastewater and the economization of water.

Although the embodiments have been described in the described and illustrated accompanying diagrams, the embodiments of the present invention are intended only for illustration, and the present invention is not limited to these embodiments. It will be appreciated to those having ordinary technical knowledge in the art to which the present invention pertains that the present invention may be modified and altered in various manners without departing from the technical spirit of the present invention set forth in the following claims.

The invention claimed is:

1. Wastewater-recycling washing equipment, comprising:
a washing tank configured to contain washing liquid therein, to have a closed top, and to include a filter unit configured to filter out impurities of the contained washing liquid;
a washing loading unit configured to communicate with the washing tank, provided above the washing tank, equipped with a lifting carrier that supports the entered object to be washed and that is lowered into the washing tank so that the object to be washed is immersed into the washing liquid contained in the washing tank, and provided with a washing lifting drive unit that is driven to selectively lift and lower the lifting carrier;
a washing circulation unit including spray nozzles provided inside the washing tank and the washing loading unit to spray the washing liquid to the object to be washed, respectively, a spray pipeline configured to connect the washing tank and the spray nozzles such that the washing liquid contained in the washing tank is sprayed via the spray nozzles, and a spray pump configured to be driven such that the washing liquid contained in the washing tank is sprayed via the spray nozzles; and
a wastewater reclamation apparatus provided to be separate from the washing tank, provided such that waste washing liquid discharged from the washing tank enters, is heated, and is supplied in a vapor form back into washing liquid inside the washing tank, and provided such that pollutants chemically combined with waste washing liquid are separately stored in a dehydrated state;
wherein the wastewater reclamation apparatus includes a reclamation tank temperature sensor configured to detect a temperature of the waste washing liquid heated therein, and a wastewater level gauge configured to detect a level of the waste washing liquid stored therein;
wherein the wastewater reclamation apparatus includes a reclamation tank provided to be separate from the washing tank and connected to the washing tank via a vapor supply tube connected to a top of the reclamation tank, and a heater provided in the reclamation tank and configured to heat the waste washing liquid;
wherein a reclamation washing liquid storage tank separated by a partition and connected to a reclamation washing liquid circulation pipeline so that contained reclamation washing liquid is supplied via the spray nozzle provided inside the washing loading unit is provided to one side of the washing tank, and a reclamation aeration nozzle connected to the vapor supply tube is provided inside the reclamation washing liquid storage tank; and
wherein a liquid separation unit provided as a spiral cyclone in which a spiral inlet is provided and configured such that vapor bubbles or liquid material fall along a conic wall while being rotated by centrifugal force and only pure vapor deprived of vapor bubbles or liquid material rises and enters into the vapor supply tube is provided in a portion to which the vapor supply tube is connected inside the reclamation tank.

2. The wastewater-recycling washing equipment of claim 1, wherein the reclamation tank includes a plurality of reclamation tanks provided such that waste washing liquid heated in a reclamation tank first connected to the washing tank sequentially enters into one or more remaining reclamation tanks.

3. The wastewater-recycling washing equipment of claim 1, wherein the vapor supply tube is also connected to the spray pipeline provided with the spray nozzle so that vapor is supplied via the spray nozzle provided inside the washing loading unit.

4. The wastewater-recycling washing equipment of claim 1, wherein:
a dry chamber communicatively disposed behind the washing loading unit is provided such that the object lifted into the washing loading unit is transferred into the dry chamber; and
a vapor spray nozzle connected to the vapor supply tube is provided inside the dry chamber so that vapor inside the reclamation tank is supplied to the dry chamber.

5. The wastewater-recycling washing equipment of claim 1, wherein one or more multi-stage bubble elimination chambers separated by one or more partition plates are provided in an upper portion of an inside of the reclamation tank, and a vapor pipeline provided with a bubble elimination valve configured to control an amount of vapor to be discharged in order to sequentially reduce internal pressure is connected to each of the multi-stage bubble elimination chambers.

* * * * *